US011575201B2

United States Patent
Schmutzler et al.

(10) Patent No.: US 11,575,201 B2
(45) Date of Patent: Feb. 7, 2023

(54) ACTUATORS FOR CONTROLLING MULTIPLE PHASE SHIFTERS OF REMOTE ELECTRONIC DOWNTILT BASE STATION ANTENNAS

(71) Applicant: CommScope Technologies LLC, Hickory, NC (US)

(72) Inventors: Steven Schmutzler, Homer Glen, IL (US); Amit Kaistha, Coppell, TX (US); Chih Lin Lin Chou, Allen, TX (US); Paul Everest, Flower Mound, TX (US); Richard English, Richardson, TX (US)

(73) Assignee: CommScope Technologies LLC, Hickory, NC (US)

( * ) Notice: Subject to any disclaimer, the term of this patent is extended or adjusted under 35 U.S.C. 154(b) by 368 days.

(21) Appl. No.: 16/746,387

(22) Filed: Jan. 17, 2020

(65) Prior Publication Data

US 2020/0161758 A1    May 21, 2020

Related U.S. Application Data

(63) Continuation of application No. 15/622,407, filed on Jun. 14, 2017, now Pat. No. 10,581,163.

(Continued)

(51) Int. Cl.
*H01Q 3/30*      (2006.01)
*H01Q 3/32*      (2006.01)
(Continued)

(52) U.S. Cl.
CPC ............... *H01Q 3/32* (2013.01); *F16H 25/20* (2013.01); *H01P 1/184* (2013.01); *H01Q 3/005* (2013.01);
(Continued)

(58) Field of Classification Search
CPC ............ H01Q 3/32; H01Q 3/005; H01Q 3/06; H01Q 1/246; F16H 25/20; F16H 2025/2071
See application file for complete search history.

(56) References Cited

U.S. PATENT DOCUMENTS

| 6,573,875 B2 | 6/2003 | Zimmerman et al. |
| 6,603,436 B2 | 8/2003 | Heinz et al. |

(Continued)

FOREIGN PATENT DOCUMENTS

| CA | 2713962 | 2/2012 |
| CN | 2012149779 | 11/2012 |

(Continued)

OTHER PUBLICATIONS

International Search Report and the Written Opinion of the International Searching Authority corresponding to International Patent Application No. PCT/US2017/037358, dated Sep. 25, 2017.

(Continued)

*Primary Examiner* — Zakaria Elahmadi
(74) *Attorney, Agent, or Firm* — Myers Bigel, P.A.

(57) ABSTRACT

Multi-RET actuators include a plurality of shafts that have respective axially-drivable members mounted thereon. Each of axially-drivable member is mechanically linked to a respective one of a plurality of phase shifters. The multi-RET actuator further includes a motor having a drive shaft and a gear system that is configured to selectively couple the motor to the respective shafts. The gear system is configured so that rotation of the drive shaft in a first direction creates a mechanical linkage between the motor and a first of the shafts 1340/1342, and rotation of the drive shaft in a second direction that is opposite the first direction rotates the first of the shafts.

28 Claims, 15 Drawing Sheets

Related U.S. Application Data

(60) Provisional application No. 62/350,252, filed on Jun. 15, 2016, provisional application No. 62/370,065, filed on Aug. 2, 2016, provisional application No. 62/420,773, filed on Nov. 11, 2016.

(51) Int. Cl.
   *H01P 1/18* (2006.01)
   *F16H 25/20* (2006.01)
   *H01Q 3/00* (2006.01)
   *H01Q 3/06* (2006.01)
   *H01Q 1/24* (2006.01)

(52) U.S. Cl.
   CPC ....... *H01Q 3/06* (2013.01); *F16H 2025/2071* (2013.01); *H01Q 1/246* (2013.01)

(56) References Cited

U.S. PATENT DOCUMENTS

| | | | |
|---|---|---|---|
| 8,085,211 B2 | 12/2011 | Yang et al. | |
| 8,391,926 B2 | 3/2013 | Seeor et al. | |
| 8,674,787 B2 | 3/2014 | Bradley et al. | |
| 8,860,334 B2 | 10/2014 | Zhao | |
| 9,343,811 B2 | 5/2016 | Xie et al. | |
| 9,425,506 B2 | 8/2016 | Zimmermann et al. | |
| 2003/0177862 A1* | 9/2003 | Chan | B23Q 5/34 74/661 |
| 2006/0053913 A1* | 3/2006 | Sinn | F02N 15/068 74/6 |
| 2008/0316133 A1* | 12/2008 | Guixa Arderiu | H01Q 3/32 343/766 |
| 2010/0201590 A1* | 8/2010 | Girard | H01Q 21/08 343/757 |
| 2010/0201591 A1 | 8/2010 | Girard et al. | |
| 2011/0183624 A1* | 7/2011 | V. | H01Q 1/246 455/63.4 |
| 2013/0127377 A1 | 5/2013 | Zhao | |
| 2013/0307728 A1* | 11/2013 | Berger | H01Q 1/246 342/374 |
| 2014/0352493 A1 | 12/2014 | Chung | |
| 2016/0352011 A1* | 12/2016 | Duan | H01Q 3/32 |
| 2017/0047653 A1 | 2/2017 | Runyon et al. | |
| 2017/0373392 A1 | 12/2017 | Kim et al. | |

FOREIGN PATENT DOCUMENTS

| | | | |
|---|---|---|---|
| CN | 202757608 | 2/2013 | |
| CN | 203026642 | 6/2013 | |
| CN | 103855470 | 6/2014 | |
| CN | 203787537 | 8/2014 | |
| CN | 104090531 | 10/2014 | |
| CN | 104577336 | 4/2015 | |
| CN | 105720370 | 6/2016 | |
| CN | 206022623 | 3/2017 | |
| KR | 101600832 | 3/2016 | |
| KR | 101600832 B1 * | 3/2016 | |
| WO | 0237656 | 5/2002 | |
| WO | 2015117279 | 8/2015 | |
| WO | WO-2015117279 A1 * | 8/2015 | H01Q 3/32 |
| WO | 2016137567 | 9/2016 | |

OTHER PUBLICATIONS

PCT International Preliminary Report on Patentability corresponding to International Patent Application No. PCT/US2017/037358, dated Dec. 18, 2018.

Extended European Search Report, dated Dec. 17, 2019, for corresponding European Application No. EP17813983.8 (21 pages).

* cited by examiner

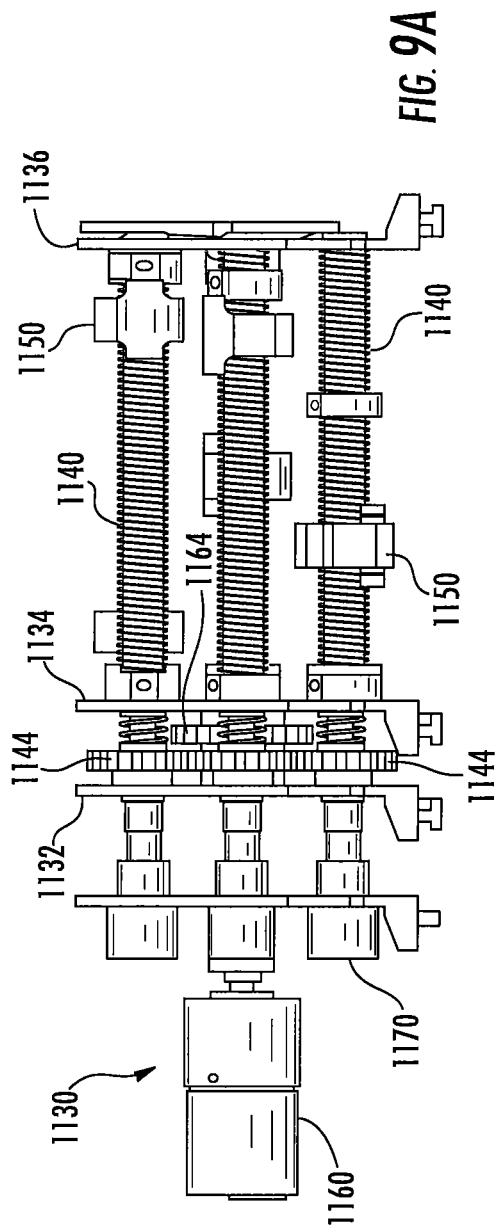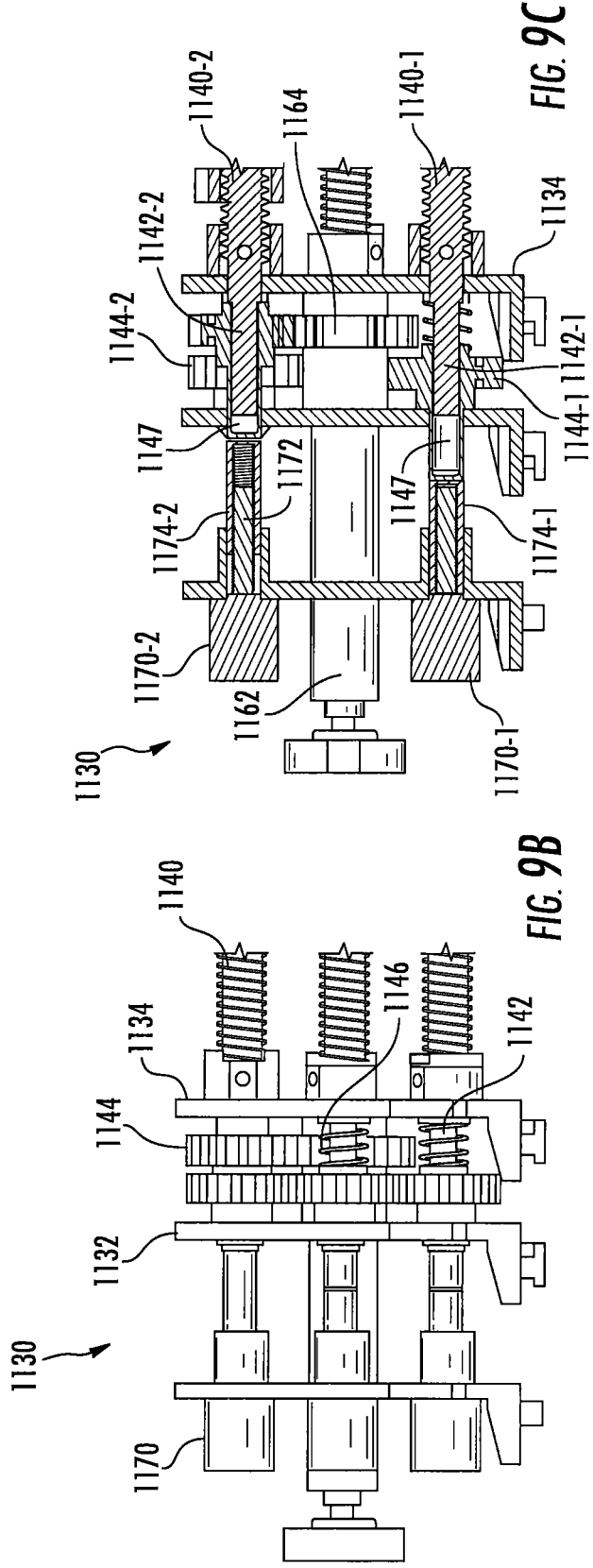

ACTUATORS FOR CONTROLLING MULTIPLE PHASE SHIFTERS OF REMOTE ELECTRONIC DOWNTILT BASE STATION ANTENNAS

CROSS-REFERENCE TO RELATED APPLICATIONS

This application claims priority under 35 U.S.C. § 120 to U.S. patent application Ser. No. 15/622,407, filed Jun. 14, 2017, which in turn claims priority to U.S. Provisional Patent Application Ser. No. 62/350,252, filed Jun. 15, 2016, and U.S. Provisional Patent Application Ser. No. 62/370,065, filed Aug. 2, 2016, and U.S. Provisional Patent Application Ser. No. 62/420,773, filed Nov. 11, 2016, the entire contents of each of which is incorporated herein by reference.

FIELD OF THE INVENTION

The present invention relates to communication systems and components, and in particular, to actuators for electro-mechanical phase shifters used in base station antennas.

BACKGROUND

Base station antennas for wireless communication systems are used to transmit radio frequency ("RF") signals to, and receive RF signals from, cellular. Base station antennas are directional devices that can concentrate the RF energy that is transmitted in certain directions (or received from those directions). The "gain" of a base station antenna in a given direction is a measure of the ability of the antenna to concentrate the RF energy in that particular direction. The "radiation pattern" of a base station antenna is compilation of the gain of the antenna across all different directions. The radiation pattern of a base station antenna is typically designed to service a pre-defined coverage area, which refers to a geographic region in which mobile users can communicate with the cellular network through the base station antenna. The base station antenna may be designed to have minimum gain levels throughout this pre-defined coverage area, and it is typically desirable that the base station antenna have much lower gain levels outside of the coverage area. Early base station antennas typically had a fixed radiation pattern, meaning that once a base station antenna was installed, its radiation pattern could not be changed unless a technician physically reconfigured the antenna. Unfortunately, such manual reconfiguration of base station antennas after deployment, which could become necessary due to changed environmental conditions or the installation of additional base stations, was typically difficult, expensive and time-consuming.

More recently, base station antennas have been deployed that have radiation patterns that can be reconfigured from a remote location. For example, base station antennas have been developed for which settings such as the down tilt angle, beam width and/or azimuth angle of the antenna can be reconfigured from a remote location by transmitting control signals to the antenna. Base station antennas that can have their down tilt or "elevation" angle changed from a remote location are typically referred to as remote electrical tilt ("RET") antennas, although the term "RET antenna" is now also commonly used to cover antennas that can have their azimuth angle and/or beam width adjusted from a remote location. RET antennas allow wireless network operators to remotely adjust the radiation pattern of the antenna through the use of electro-mechanical actuators that may adjust phase shifters or other devices in the antenna to affect the radiation pattern of the antenna. Typically, the radiation pattern of a RET antenna is adjusted using actuators that are controlled via control signal specifications promulgated by the Antenna Interface Standards Group ("AISG").

Base station antennas typically comprise a linear array or a two-dimensional array of radiating elements such as dipole or crossed dipole radiating elements. In order to change the down tilt angle of these antennas, a phase taper may be applied across the radiating elements, as is well understood by those of skill in the art. Such a phase taper may be applied by adjusting the settings on an adjustable phase shifter that is positioned along the RF transmission path between a radio and the individual radiating elements of the base station antenna. One known type of phase shifter is an electromechanical "wiper" phase shifter that includes a main printed circuit board and a "wiper" printed circuit board that may be rotated above the main printed circuit board. Such wiper phase shifters typically divide an input RF signal that is received at the main printed circuit board into a plurality of sub-components, and then capacitively couple at least some of these sub-components to the wiper printed circuit board. These sub-components of the RF signal may be capacitively coupled from the wiper printed circuit board back to the main printed circuit board along a plurality of arc-shaped traces, where each arc has a different diameter. Each end of each arc-shaped trace may be connected to a radiating element or to a sub-group of radiating elements. By physically rotating the wiper printed circuit board above the main printed circuit board, the location where the sub-components of the RF signal capacitively couple back to the main printed circuit board may be changed, which thus changes the path lengths from the phase shifter to the radiating elements. This change in the path lengths results in a change in the phase of the sub-components of the RF signal, and since the arcs have different radii, the change in phase experienced along each path differs. Typically, the phase taper is applied by applying positive phase shifts of various magnitudes (e.g., +1°, +2° and +3°) to some of the sub-components of the RF signal and by applying negative phase shifts of the same magnitudes (e.g., −1°, −2° and −3°) to additional of the sub-components of the RF signal. Thus, the above-described wiper phase shifters may be used to apply a phase taper to the sub-components of an RF signal that are applied to each radiating element (or sub-group of radiating elements). Exemplary phase shifters of this variety are discussed in U.S. Pat. No. 7,907,096 to Timofeev, the disclosure of which is hereby incorporated herein in its entirety. The wiper printed circuit board is typically moved using an electromechanical actuator such as a DC motor that is connected to the wiper printed circuit board via a mechanical linkage. These actuators are often referred to as RET actuators since they are used to apply the remote electronic down tilt.

SUMMARY

Pursuant to embodiments of the present invention, an actuator for a plurality of phase shifters is provided that includes a plurality of axially-drivable members, each axially-drivable member mounted on a respective parallel shaft, the axially-drivable members configured to be connected with a respective one of the phase shifters, a drive member having a primary rotary member, and a plurality of secondary rotary members, each secondary rotary member mounted on a respective one of the parallel shafts. At least one of the primary rotary member and the secondary rotary members are axially movable so that each secondary rotary member may be in either an engaged position, in which the secondary rotary member engages the drive member, or a disengaged position, in which the secondary rotary member is disengaged from the drive member. The actuator further includes a first engagement mechanism that is configured to axially move the primary rotary member or one of the secondary rotary members so that at least one of the secondary rotary members is in the engaged position and an electric motor that is configured to drive the drive member. The first engagement mechanism may comprise an electromagnetic or a piezoelectric engagement mechanism.

In some embodiments, the first engagement mechanism is an electromagnetic engagement mechanism that includes an electromagnet. The first engagement mechanism may further include a permanent magnet or a ferromagnetic structure that is axially aligned with the electromagnet. The first engagement mechanism may also include a spring that is between the permanent magnet or ferromagnetic structure and the electromagnet.

In some embodiments, the first engagement mechanism is one of a plurality of engagement mechanisms, and each of the engagement mechanisms is configured to selectively move a respective one of the secondary rotary members.

In some embodiments, the first engagement mechanism is configured to move the primary rotary member to selectively engage the primary rotary member with one of the secondary rotary members.

In some embodiments, the parallel shafts comprise worm gear shafts.

In some embodiments, the primary rotary member is a central gear and each of the secondary rotary members are gears.

In some embodiments, the axially-drivable members comprise pistons.

In some embodiments, the spring biases one of the secondary rotary member toward the disengaged position.

In some embodiments, the actuator may be part of a base station antenna that includes a plurality of linear arrays of radiating elements, where each of the phase shifters is coupled between the radiating elements of a respective one of the linear arrays and a port of a radio.

Pursuant to further embodiments of the present invention, an actuator for a plurality of phase shifters is provided that includes a motor that is configured to rotate a primary rotary member, a plurality of axially-drivable members, each axially-drivable member mounted on a respective shaft and configured to be connected with a respective one of the phase shifters, a plurality of secondary rotary members, each secondary rotary member mounted so that rotation thereof will result in rotation of a respective one of the shafts, and an electromagnet that is configured to move either the primary rotary member or a selected one of the secondary rotary members in response to a control signal so that the primary rotary member engages the selected one of the secondary rotary members.

In some embodiments, the electromagnet is configured to move the primary rotary member into engagement with the selected one of the secondary rotary members.

In some embodiments, the actuator may further include a permanent magnet or a ferromagnetic structure that is axially aligned with the electromagnet, where the electromagnet is attracted to the permanent magnet or ferromagnetic structure in response to the control signal.

In some embodiments, the actuator may further include a spring that is between the permanent magnet or ferromagnetic structure and the electromagnet, the spring biasing the primary rotary member into a disengaged position in which the primary rotary member is not engaged with any of the secondary rotary members.

In some embodiments, the actuator may further include a permanent magnet that is axially aligned with the electromagnet, where the electromagnet is repelled from the permanent magnet in response to the control signal.

In some embodiments, the actuator may further include a spring that biases the primary rotary member into a disengaged position in which the primary rotary member is not engaged with any of the secondary rotary members, where the primary rotary member is between the spring and the electromagnet.

In some embodiments, the spring may be a first spring, and the actuator may further include a second spring and the primary rotary member may be between the first and second springs.

In some embodiments, the primary rotary member is mounted on a shaft that is configured to be turned by the motor, and the primary rotary member is mounted for axial movement along the shaft and to rotate in response to rotation of the shaft:

In some embodiments, the electromagnet is configured to move the selected one of the secondary rotary members into engagement with the primary rotary member.

In some embodiments, the actuator may further include a permanent magnet or a ferromagnetic structure that is axially aligned with the electromagnet, where the electromagnet is attracted to the permanent magnet or ferromagnetic structure in response to the control signal.

In some embodiments, the actuator may further include a spring that is between the permanent magnet or ferromagnetic structure and the electromagnet, the spring biasing the selected one of the secondary rotary members into a disengaged position in which the primary rotary member is not engaged with the selected on of the secondary rotary members.

In some embodiments, the actuator may further include a permanent magnet that is axially aligned with the electromagnet, where the electromagnet is repelled from the permanent magnet in response to the control signal.

In some embodiments, the selected one of the secondary rotary members includes a rear portion having an internal cavity, the internal cavity receiving an end of a respective one of the shafts when the selected one of the secondary rotary members is engaged with the primary rotary member.

In some embodiments, the electromagnet is one of a plurality of electromagnets and the control signal is one of a plurality of control signals, and each electromagnet is configured to move a respective one of the secondary rotary members into engagement with the primary rotary member in response to a respective one of the control signals.

In some embodiments, each of the shafts comprises a worm gear shaft, the primary rotary member is a central gear and each of the secondary rotary members are gears.

Pursuant to still further embodiments of the present invention, an actuator for a plurality of phase shifters is provided that includes a motor that is configured to rotate a primary rotary member, a plurality of axially-drivable members, each axially-drivable member mounted on a respective shaft, each axially-drivable member configured to be connected with a respective one of the phase shifters, a plurality of secondary rotary members, each secondary rotary member mounted so that rotation thereof will result in rotation of a respective one of the shafts, and a piezoelectric actuator that is configured to move a selected one of the secondary rotary members in response to a control signal to be rotatably engaged with the primary rotary member.

Pursuant to still further embodiments of the present invention, an actuator for a plurality of phase shifters is provided that includes a plurality of axially-drivable members, each axially-drivable member mounted on a respective parallel shaft, the axially-drivable members configured to be connected with a respective one of the phase shifters, a central drive member, a plurality of rotary members, each mounted on a respective one of the parallel shafts, an engagement mechanism that is configured to rotate to selectively and exclusively engage each of the shafts to move a respective rotary member to the engaged position a first drive unit to drive the central drive member, and a second drive unit configured to drive the engagement mechanism. Each of the rotary members is axially movable between an engaged position, in which the rotary member engages the central drive member, and a disengaged position, in which each rotary member is disengaged from the central drive member.

In some embodiments, the axially-drivable members comprise pistons.

In some embodiments, the parallel shafts comprise worm gear shafts.

In some embodiments, the parallel shafts include spring-loaded shafts that bias the rotary members toward the disengaged position.

In some embodiments, the engagement mechanism comprises a cam that engages one of the parallel shafts to move a respective rotary member attached to the shaft to the engaged position.

In some embodiments, the engagement mechanism includes a ring gear, and wherein the ring gear engages the second drive unit.

In some embodiments, the central drive member is a central drive gear.

In some embodiments, the rotary members are gears.

Pursuant to still further embodiments of the present invention, an actuator for a plurality of phase shifters is provided that includes a plurality of axially-drivable members, each axially-drivable member mounted on a respective parallel shaft, the axially-drivable members configured to be connected with a respective one of the phase shifters, a central drive gear, a plurality of gears, each mounted on a respective one of the parallel shafts, an engagement mechanism that is configured to rotate to selectively and exclusively engage each of the shafts to move a respective gear to the engaged position in which the gear engages the central drive gear, a first drive unit to drive the central drive gear, and a second drive unit configured to drive the engagement mechanism.

In some embodiments, the axially-drivable members comprise pistons and/or the parallel shafts comprise worm gear shafts.

In some embodiments, the parallel shafts include spring-loaded shafts that bias the gears toward the disengaged position.

In some embodiments, the engagement mechanism comprises a cam that engages one of the parallel shafts to move a respective gear attached to the shaft to the engaged position.

In some embodiments, the engagement mechanism includes a ring gear, and wherein the ring gear engages the second drive unit.

Pursuant to still further embodiments of the present invention, an actuator for a plurality of phase shifters is provided that includes a plurality of axially-drivable members, each axially-drivable member mounted on a respective parallel shaft, the axially-drivable members configured to be connected with a respective one of the phase shifters, a central drive gear, a plurality of gears that are mounted on respective ones of the parallel shafts and that are each axially movable between an engaged position, in which the gear engages the central drive gear, and a disengaged position, in which each gear is disengaged from the central drive gear, a cam plate with a cam that is configured to rotate such that the cam selectively and exclusively engages each of the shafts to move a respective gear to the engaged position, a first drive unit to drive the central drive gear, and a second drive unit configured to drive the cam plate.

In some embodiments, the axially-drivable members comprise pistons and/or the parallel shafts comprise worm gear shafts.

In some embodiments, the parallel shafts include spring-loaded shafts that bias the gears toward the disengaged position.

In some embodiments, the cam plate includes a ring gear, and the ring gear engages the second drive unit.

Pursuant to still further embodiments of the present invention, an actuator for a plurality of phase shifters is provided that includes a plurality of shafts having respective axially-drivable members mounted thereon, each axially-drivable member configured to be connected with a respective one of the phase shifters, a motor having a drive shaft, and a gear system that is configured to selectively couple the motor to the respective shafts. The gear system is configured so that rotation of the drive shaft in a first rotative direction creates a mechanical linkage between the motor and a first of the shafts, and rotation of the drive shaft in a second rotative direction that is opposite the first rotative direction rotates the first of the shafts.

In some embodiments, the gear system includes a forward-direction primary drive gear that is connected to the drive shaft and a reverse-direction primary drive gear that is connected to the drive shaft In some embodiments, the forward-direction primary drive gear and the reverse-direction primary drive gear are each ratcheted gears that rotate in response to rotation of the drive shaft in the second rotative direction and which do not rotate in response to rotation of the drive shaft in the first rotative direction.

In some embodiments, the actuator further includes a reversing gear that is configured to engage the reverse-direction primary drive gear and rotate in a direction opposite to the direction of rotation of the reverse-direction primary drive gear.

In some embodiments, the gear system further includes a plurality of secondary drive members mounted on respective ones of the shafts, each secondary drive member mounted so that rotation thereof will result in rotation of a respective one of the shafts.

In some embodiments, the gear system includes an engagement mechanism that is configured to rotate to selectively and exclusively engage one or more of the shafts to move a selected one of the secondary drive members into engagement with one of the forward-direction primary drive gear or the reversing gear.

In some embodiments, the engagement member comprises a rotating cam plate.

Pursuant to still further embodiments of the present invention, a method of adjusting a phase shifter is provided in which a drive shaft is rotated in a first rotative direction to connect a first of a plurality of gears to a drive mechanism and then the drive shaft is rotated in a second rotative direction to rotate the drive mechanism, where rotation of the drive mechanism causes rotation of the first of the plurality of gears and rotation of the first of the plurality of gears mechanically adjusts a physical position of a component of the phase shifter.

In some embodiments, the plurality of gears comprises a plurality of secondary drive gears that are configured to rotate respective shafts, and the drive mechanism comprises a forward-direction primary drive gear that is connected to the drive shaft and a reverse-direction primary drive gear that is connected to the drive shaft.

In some embodiments, the forward-direction primary drive gear is a ratcheted gear that only rotates in response to rotation of the drive shaft in a first rotative direction.

In some embodiments, the reverse-direction primary drive gear is a ratcheted gear that only rotates in response to rotation of the drive shaft in the first rotative direction.

In some embodiments, rotating the drive shaft in the first rotative direction to connect the first of the plurality of gears to the drive mechanism comprises using the rotating drive shaft to rotate a cam to move the first of the plurality of gears into operative engagement with one of the forward-direction primary drive gear or the reverse-direction primary drive gear.

In some embodiments, at least one of the forward-direction primary drive gear or the reverse-direction primary drive gear is configured to engage the first of the plurality of gears through an intervening reversing gear.

Pursuant to still further embodiments of the present invention, an actuator for a plurality of phase shifters is provided that includes a motor that is configured to rotate a primary rotary member, a plurality of axially-drivable members, each axially-drivable member mounted on a respective shaft, each axially-drivable member configured to be connected with a respective one of the phase shifters, a plurality of secondary rotary members, each secondary rotary member mounted so that rotation thereof will result in rotation of a respective one of the shafts, and a plurality of micro-motors, each micro-motor configured to rotate a respective one of the shafts.

In some embodiments, the shafts comprise worm gear shafts.

In some embodiments, the primary rotary member is a central gear and each of the secondary rotary members are gears.

In some embodiments, the axially-drivable members comprise pistons.

In some embodiments, the actuator further includes a plurality of springs that are mounted on the respective shafts, each spring configured to bias a respective one of the secondary rotary member toward a disengaged position where the secondary rotary member does not engage the primary drive member.

BRIEF DESCRIPTION OF THE DRAWINGS

FIG. 9A is a side view of a multi-RET actuator according to further embodiments of the present invention.

FIG. 9B is a partial side view of the multi-RET actuator of FIG. 9A with one of the secondary drive gears engaged with the primary drive gear.

FIG. 9C is a partial side sectional view of the multi-RET actuator of FIG. 9A.

DETAILED DESCRIPTION

Figure 1A:
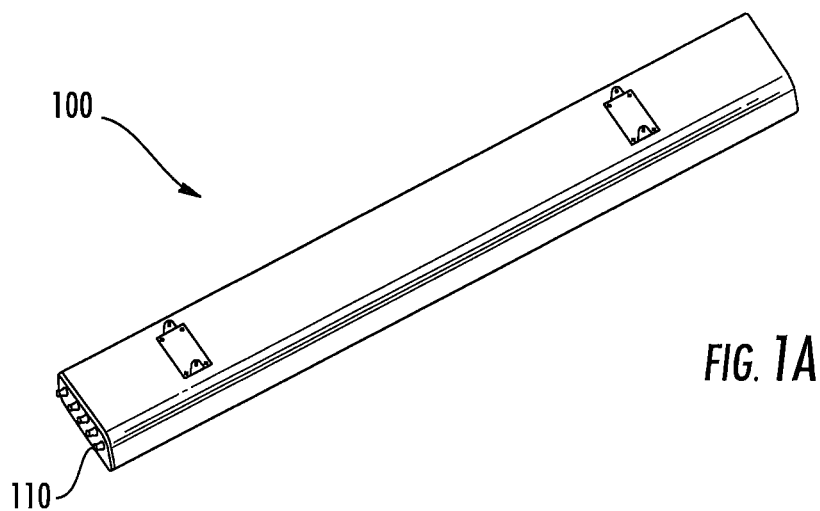
FIG. 1A is a perspective view of a base station antenna that includes a single motor multi-RET actuator according to embodiments of the present invention.

Modern base station antennas often include two, three or more linear arrays of cross-polarized radiating elements. Thus, it is not uncommon for a base station antenna to have eight, twelve or even more adjustable phase shifters for applying remote electronic down tilts to the linear arrays. Such a large number of phase shifters and associated RET actuators and mechanical linkages can significantly increase the size, weight and cost of the base station antenna.

Conventionally, a separate RET actuator has been provided for each phase shifter (or pair of phase shifters if dual polarized radiating elements are used in a linear array, as the same phase shift is typically applied to each polarization). More recently, RET actuators have been proposed that may be used to move the wiper printed circuit board on as many as twelve phase shifters. For example, U.S. Patent Publication No. 2013/0307728 ("the '728 publication") discloses a RET actuator that may be used to drive six different mechanical linkages for purposes of adjusting six different phase shifters using one multi-RET actuator.

Pursuant to embodiments of the present invention, fully automated multi-RET actuators are provided. The multi-RET actuators according to embodiments of the present invention may be controlled from a remote location to independently adjust the settings of one or more of a plurality of phase shifters. In some embodiments, the multi-RET actuators include two motors. In these embodiments, the first motor may operate to select one of a plurality of mechanical linkages that is to be moved, and the second motor may be used to move the selected mechanical linkage. In other embodiments, single motor multi-RET actuators are provided. In some of these single-motor embodiments, a ratcheted gear system may be provided that allows the motor to both select the mechanical linkage that is to be moved and to then move the selected mechanical linkage. In other embodiments, a separate actuator system such as, for example, remotely controlled electromagnets may be used to select the mechanical linkage that is to be moved, and the single motor may then be used to move the selected mechanical linkage. In still other embodiments, multi-RET actuators are provided that use a main drive motor and a plurality of micro-motors.

The multi-RET actuators according to embodiments of the present invention may be used to rotate a primary drive gear (or a pair of primary drive gears in one embodiment) that is mounted on the drive shaft of a motor. A plurality of worm gear shafts are provided, each of which has a respective secondary drive gear associated therewith. A selected one or more of the secondary drive gears may be moved to engage the primary drive gear. Each secondary drive gear may be connected to its associated worm gear shaft so that rotation of the primary drive gear causes the selected secondary drive gear to rotate, which in turn imparts rotational movement to the worm gear shaft on which the selected secondary drive gear is mounted. Rotation of the worm gear shaft causes a piston mounted thereon to move along the longitudinal axis of its worm gear shaft. Each piston may be connected via a mechanical linkage to a wiper arm on an adjustable phase shifter so that movement of the piston may be used to adjust the setting of the phase shifter.

In order to allow the adjustable phase shifters that are connected to each respective mechanical linkage to be independently adjusted, the multi-RET actuators according to embodiments of the present invention can select which of the secondary drive gears contacts the primary drive gear so that movement of the primary drive gear results in corresponding rotation of only the selected secondary drive gear. In some embodiments, electromagnets may be used to move selected ones of the secondary drive gears into engagement with the primary drive gear in response to control signals from a remote location. In other embodiments, piezoelectric actuators may be used to move selected ones of the secondary drive gears into engagement with the primary drive gear. In still other embodiments, other electro-mechanical mechanisms may be provided that move selected ones of the secondary drive gears into engagement with the primary drive gear. In further embodiments, micro-motors may be used to move selected ones of the secondary drive gears into engagement with the primary drive gear. In still other embodiments, an indexing cam plate may be used to move selected ones of the secondary drive gears into engagement with the primary drive gear. Moreover, while the embodiments discussed below primarily (but not exclusively) discuss actuators in which the selected secondary drive gears are moved to engage the primary drive gear, it will be appreciated that in other embodiments the primary drive gear may be moved to engage one or more selected secondary drive gears.

Embodiments of the present invention will now be discussed in greater detail with reference to the drawings.

Figure 1B:
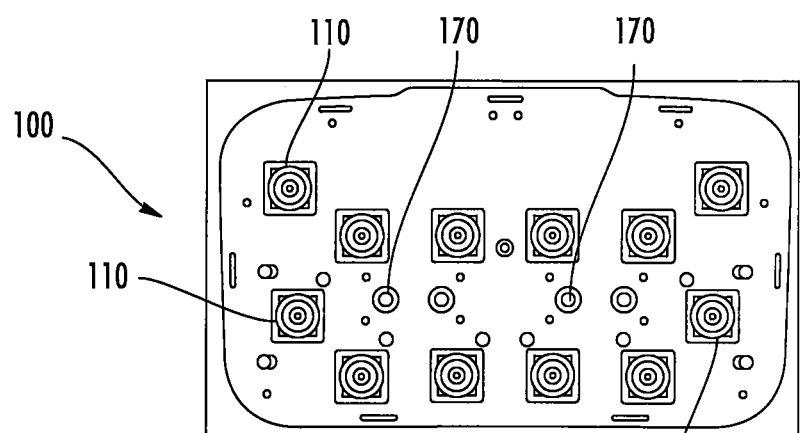
FIG. 1B is an end view of the base station antenna of FIG. 1A that illustrates the input/output ports thereof.
Figure 1C:
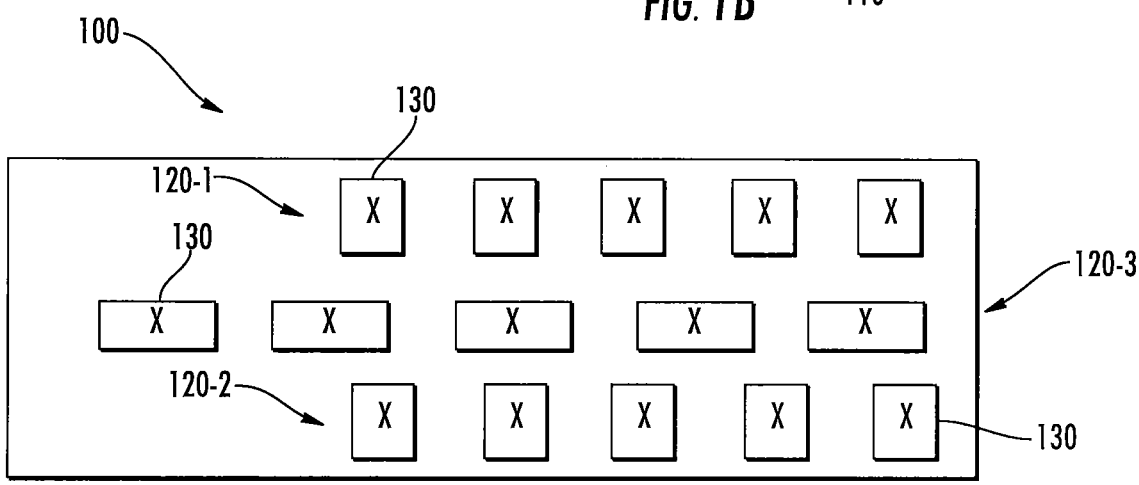
FIG. 1C is a schematic plan view of the base station antenna of FIG. 1A that illustrates the three linear arrays of radiating elements thereof.
Figure 2:
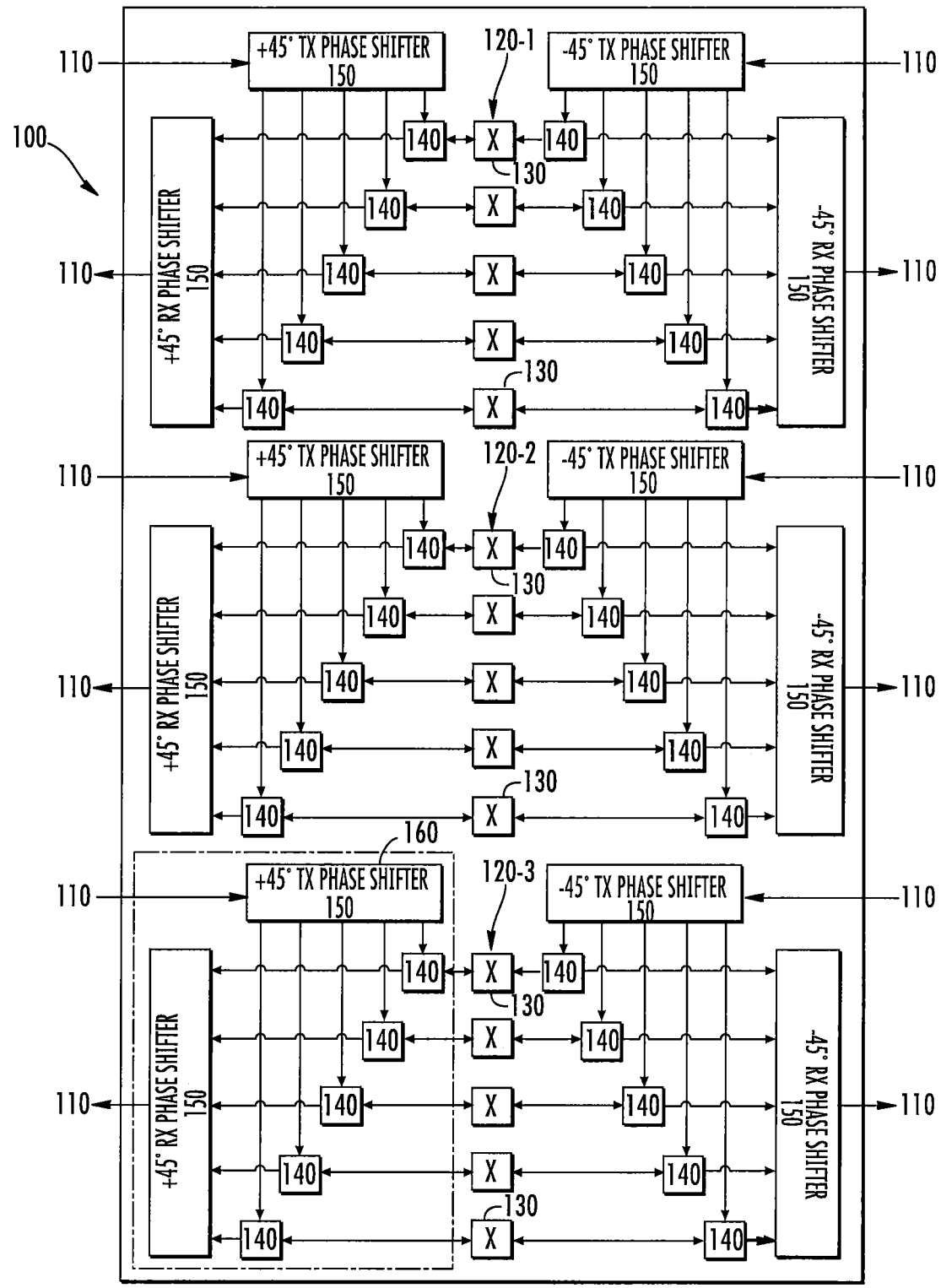
FIG. 2 is a schematic block diagram illustrating the connections between various components of the base station antenna of FIG. 1.

FIG. 1A is a perspective view of a RET base station antenna 100 that may include any of the multi-RET actuators according to embodiments of the present invention that are disclosed herein. FIG. 1B is an end view of the base station antenna 100 that illustrates the input/output ports thereof. FIG. 1C is a schematic plan view of the base station antenna 100 that illustrates the three linear arrays of radiating elements thereof. FIG. 2 is a schematic block diagram illustrating various internal components of the RET antenna 100 and the connections therebetween. It should be noted that FIG. 2 does not show the actual location of the various elements on the antenna, but instead is drawn to shown the connections between the various elements with a minimal number of connection lines crossing. It will also be appreciated that the connection lines in FIG. 2 represent paths for electrical signals (e.g., RF transmission lines).

Referring to FIGS. 1A-1C and FIG. 2, the RET antenna 100 includes, among other things, input/output ports 110, a plurality of linear arrays 120 of radiating elements 130, duplexers 140, phase shifters 150 and control ports 170. As shown in FIGS. 1C and 2, the antenna 100 includes a total of three linear arrays 120 (labeled 120-1 through 120-3) that each include five radiating elements 130. It will be appreciated, however, that the number of linear arrays 120 and the number of radiating elements 130 included in each of the linear arrays 120 may be varied. It will also be appreciated that different linear arrays 120 may have different numbers of radiating elements 130.

Referring to FIG. 2, the connections between the input/output ports 110, radiating elements 130, duplexers 140 and phase shifters 150 are schematically illustrated. Each set of an input port 110 and a corresponding output port 110, and their associated phase shifters 150 and duplexers 140, may comprise a corporate feed network 160. A dashed box is used to illustrate one such corporate feed network 160 in FIG. 2. Each corporate feed network 160 connects the radiating elements 130 of one of the linear arrays 120 to a respective pair of input/output ports 110.

As shown schematically in FIG. 2 by the "X" that is included in each box, the radiating elements 130 may be cross-polarized radiating elements 130 such as +45°/−45° slant dipoles that may transmit and receive RF signals at two orthogonal polarizations. Any other appropriate radiating element 130 may be used including, for example, single dipole radiating elements or patch radiating elements (including cross-polarized patch radiating elements). When cross-polarized radiating elements 130 are used, two corporate feed networks 160 may be provided per linear array 120, a first of which carries RF signals having the first polarization (e.g., +45°) between the radiating elements 130 and a first pair of input/output ports 110 and the second of which carries RF signals having the second polarization (e.g., −45°) between the radiating elements 130 and a second pair of input/output ports 110, as shown in FIG. 2.

As shown in FIG. 2, an input port of each transmit ("TX") phase shifter 150 may be connected to a respective one of the input ports 110. Each input port 110 may be connected to the transmit output port of a radio (not shown) such as a remote radio head. Each transmit phase shifter 150 has five output ports that are connected to respective ones of the radiating elements 130 through respective duplexers 140. The transmit phase shifters 150 may divide an RF signal that is input to an input port 110 into a plurality of sub-components and may effect a phase taper to the sub-components of the RF signal that are provided to the radiating elements 130. In a typical implementation, a linear phase taper may be applied to the radiating elements 130. As an example, the first radiating element 130 in a linear array 120 may have a phase of $Y°+2X°$, the second radiating element 130 in the linear array 120 may have a phase of $Y°+X°$, the third radiating element 130 in the linear array 120 may have a phase of $Y°$, the fourth radiating element 130 in the linear array 120 may have a phase of $Y°−X°$, and the fifth radiating element 130 in the linear array 120 may have a phase of $Y°−2X°$, where the radiating elements 130 are arranged in numerical order.

Similarly, each receive ("RX") phase shifter 150 may have five input ports that are connected to respective ones of the radiating elements 130 through respective duplexers 140 and an output port that is connected to one of the output ports 110. The output port 110 may be connected to the receive port of a radio (not shown). The receive phase shifters 150 may effect a phase taper to the RF signals that are received at the five radiating elements 130 of the linear array 120 and may then combine those RF signals into a composite received RF signal. Typically, a linear phase taper may be applied to the radiating elements as is discussed above with respect to the transmit phase shifters 150.

The duplexers 140 may be used to couple each radiating element 130 to both a transmit phase shifter 150 and to a receive phase shifter 150. As is well known to those of skill in the art, a duplexer is a three port device that (1) passes signals in a first frequency band (e.g., the transmit band) through a first port while not passing signals in a second band (e.g., a receive band), (2) passes signals in the second frequency band while not passing signals in the first frequency band through a second port thereof and (3) passes signals in both the first and second frequency bands through the third port thereof, which is often referred to as the "common" port.

As can be seen from FIG. 2, a base station antenna 100 that includes three linear arrays 120 of radiating elements 130 may include a total of twelve phase shifters 150. While the two transmit phase shifters 150 for each linear array 120 (i.e., one transmit phase shifter 150 for each polarization) may not need to be controlled independently (and the same is true with respect to the two receive phase shifters 150 for each linear array 120), there still are six sets of two phase shifters 150 that should be independently controllable. Accordingly, six RET actuators would conventionally be used in a base station antenna having the linear array arrangement of base station antenna 100.

The base station antenna 100 may include various other components such as low noise amplifiers, one or more processors, etc. that are not pictured in FIGS. 1A-1C and FIG. 2.

Each phase shifter 150 shown in FIG. 2 may be implemented as a rotating wiper phase shifter. The phase shifts imparted by the phase shifter 150 to each sub-component of the RF signal may be controlled by a mechanical positioning system that physically changes the position of the rotating wiper of each phase shifter 150, as will be explained with reference to FIG. 3.

Figure 3:
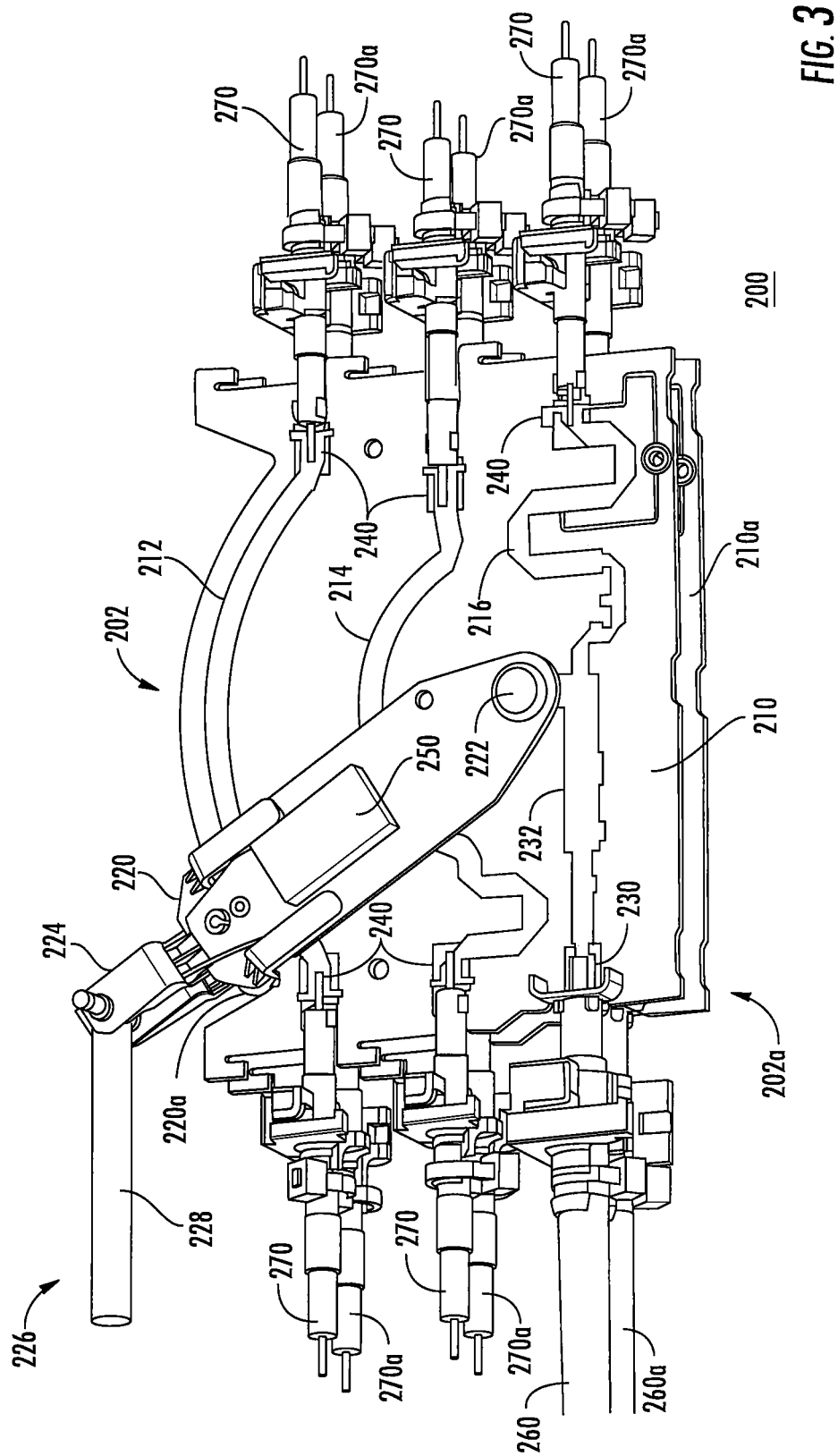
FIG. 3 is a front perspective view of a pair of electromechanical phase shifters that may be included in the base station antenna of FIG. 1.

Referring to FIG. 3, a dual rotating wiper phase shifter assembly 200 is illustrated that may be used to implement, for example, two of the transmit phase shifters 150 of FIG. 2 (that are associated with the same linear array 120) or two of the receive phase shifters 150 of FIG. 2 (that, again, are associated with the same linear array 120). The dual rotating wiper phase shifter assembly 200 includes first and second phase shifters 202, 202a. In the description of FIG. 3 that follows it is assumed that the two phase shifters 202, 202a are each transmit phase shifters that have one input and five outputs. It will be appreciated that if the phase shifters 202, 202a are instead used as receive phase shifters then the terminology changes, because when used as receive phase shifters there will be five inputs and a single output.

As shown in FIG. 3, the dual phase shifter 200 includes first and second main (stationary) printed circuit boards 210, 210a that are arranged back-to-back as well as first and second rotatable wiper printed circuit boards 220, 220a (wiper printed circuit board 220a is barely visible in the view of FIG. 3) that are rotatably mounted on the respective main printed circuit boards 210, 210a. The wiper printed circuit boards 220, 220a may be pivotally mounted on the respective main printed circuit boards 210, 210a via a pivot pin 222. The two rotatable wiper printed circuit boards 220, 220a may be joined together at their distal ends via a bracket 224.

The position of each rotatable wiper printed circuit boards 220, 220a above its respective main printed circuit board 210, 210a is controlled by the position of a linkage shaft 228, the end of which may constitute one end of a mechanical linkage 226. The other end of the mechanical linkage 226 (not shown) may be coupled to a multi-RET actuator according to embodiments of the present invention, as will be discussed in further detail below. A position sensor 250 may be provided on one of the rotatable wiper printed circuit boards 220, 220a to detect the position of the rotatable wiper printed circuit boards 220, 220a.

Each main printed circuit board 210, 210a includes a plurality of transmission line traces 212, 214. The transmission line traces 212, 214 are generally arcuate. In some cases the arcuate transmission line traces 212, 214 may be disposed in a serpentine pattern to achieve a longer effective length. In the example illustrated in FIG. 3, there are two arcuate transmission line traces 212, 214 per main printed circuit board 210, 210a (the traces on printed circuit board 210a are not visible in FIG. 3), with the first arcuate transmission line trace 212 being disposed along an outer circumference of each printed circuit board 210, 210a, and the second arcuate transmission line trace 214 being disposed on a shorter radius concentrically within the outer transmission line trace 212. A third transmission line trace 216 on each main printed circuit board 210, 210a connects an input pad 230 on each main printed circuit board 210, 210a to an output pad 240 that is not subjected to an adjustable phase shift.

The main printed circuit board 210 includes one or more input traces 232 leading from the input pad 230 near an edge of the main printed circuit board 210 to the position where the pivot pin 222 is located. RF signals on the input trace 232 are coupled to the transmission line traces on the wiper printed circuit board 220 (not visible in FIG. 3). The RF signals are coupled from the transmission line traces on the wiper printed circuit board 220 to the transmission line traces 212, 214 on the main printed circuit board. Each end of each transmission line trace 212, 214 may be coupled to a respective output pad 240. A coaxial cable 260 or other RF transmission line component may be connected to input pad 230 (a coaxial cable 260a is also coupled to the corresponding input pad on the main printed circuit board 210a of phase shifter 202a). A respective coaxial cable 270 or other RF transmission line component may be connected to each respective output pad 240 (coaxial cables 270a may likewise be coupled to the corresponding output pads on the main printed circuit board 210a of phase shifter 202a). Connections other than coaxial cables 260, 270 may be used in other embodiments. For example, in other embodiments, the main printed circuit board 210 may be coupled to stripline transmission lines on a panel without additional coaxial cabling. As the wiper printed circuit board 220 moves, an electrical path length from the input pad 230 of phase shifter 202 to each radiating element 130 served by the transmission lines 212, 214 changes. For example, as the wiper printed circuit board 220 moves to the left it shortens the electrical length of the path from the input pad 230 to the output pad 240 connected to the left side of transmission line trace 212 (which connects to a first radiating element 130), while the electrical length from the input pad 230 to the output pad 240 connected to the right side of transmission line trace 212 (which connects to a second radiating element) increases by a corresponding amount. These changes in path lengths result in phase shifts to the signals received at the output pads 240 connected to transmission line trace 212 relative to, for example, the output pad 240 connected to transmission line trace 216.

The second phase shifter 202a may be identical to the first phase shifter 202. As shown in FIG. 3, the rotating wiper printed circuit board 220a of phase shifter 202a may be controlled by the same linkage shaft 228 as the rotating wiper printed circuit board 220 of phase shifter 202. For example, if a linear array 120 includes dual polarized radiating elements 130, typically the same phase shift will be applied to the RF signals transmitted at each of the two orthogonal polarizations. In this case, a single mechanical linkage 226 may be used to control the positions of the wiper printed circuit boards 220, 220a on both phase shifters 202, 202a. In other cases, the wiper printed circuit boards 220, 220a of the two phase shifters 202, 202a may be connected to separate linkage shafts 228.

As noted above, various physical and/or electrical settings of a RET antenna such as antenna 100 including the elevation angle can be controlled from a remote location by transmitting control signals to the antenna 100 that cause electromechanical actuators to adjust the settings on the electro-mechanical phase shifters 150. Conventionally, a separate actuator was provided for each phase shifter 150 (or for a pair of phase shifters 150 associated with cross-polarized radiating elements 130). As discussed above, more recently multi-RET actuators have been suggested that may be used to control a plurality of different phase shifters. These multi-RET actuators use a first "drive" motor to drive the mechanical linkages and a second "indexing" motor to selectively connect one of the mechanical linkages to the first drive motor.

Figure 4A:
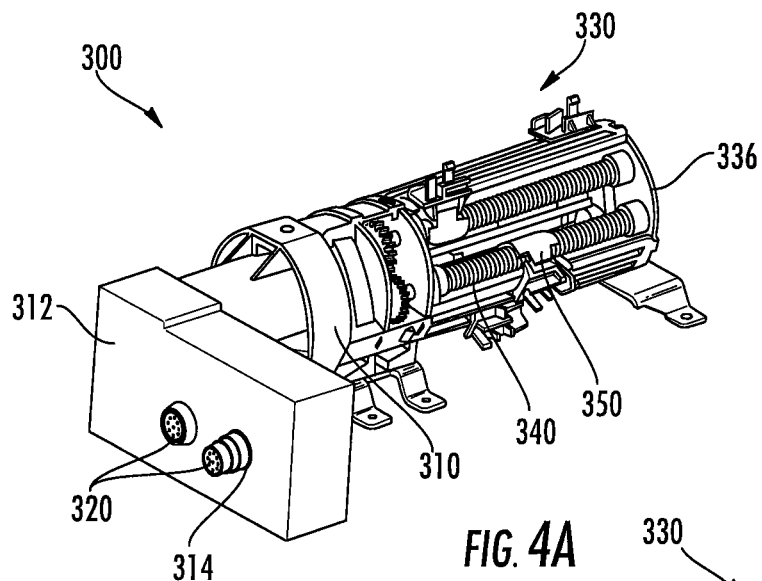
FIG. 4A is a perspective view of a single motor multi-RET actuator assembly according to embodiments of the present invention.
Figure 4B:
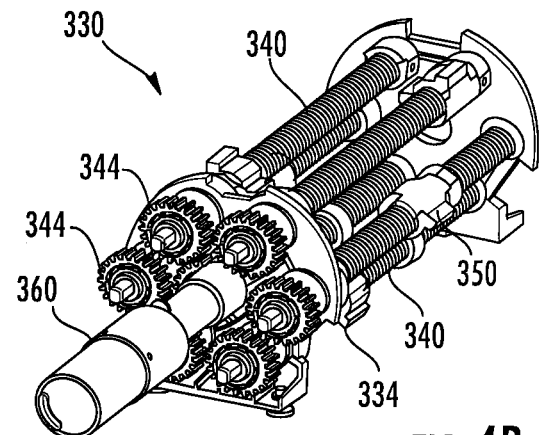
FIG. 4B is a front perspective view of the multi-RET actuator included in the multi-RET actuator assembly of FIG. 4A with one of the base plates removed therefrom.
Figure 4C:
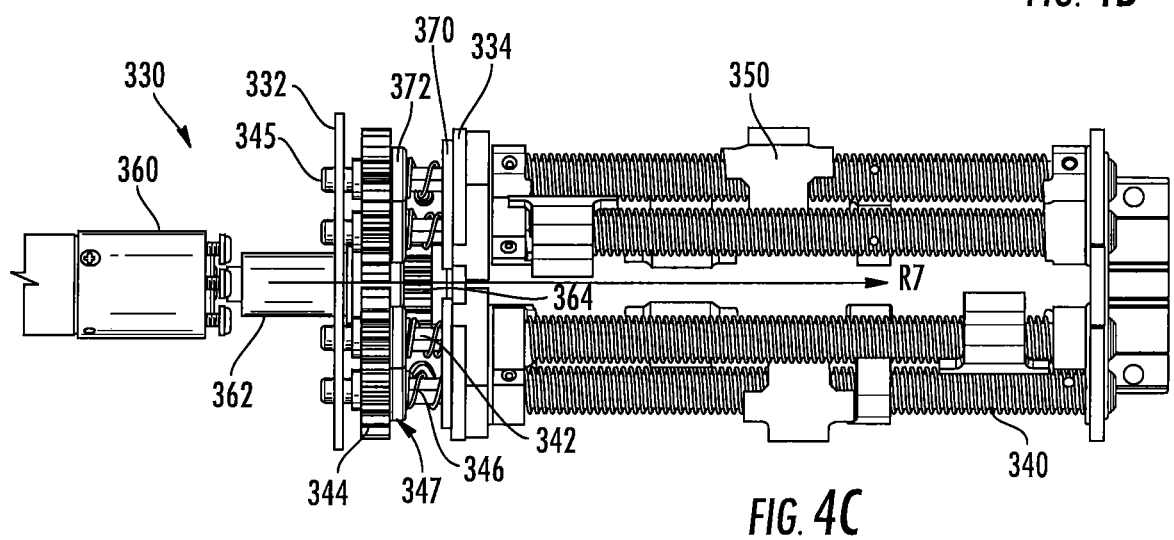
FIG. 4C is a side perspective view of the multi-RET actuator of FIG. 4B.
Figure 4D:
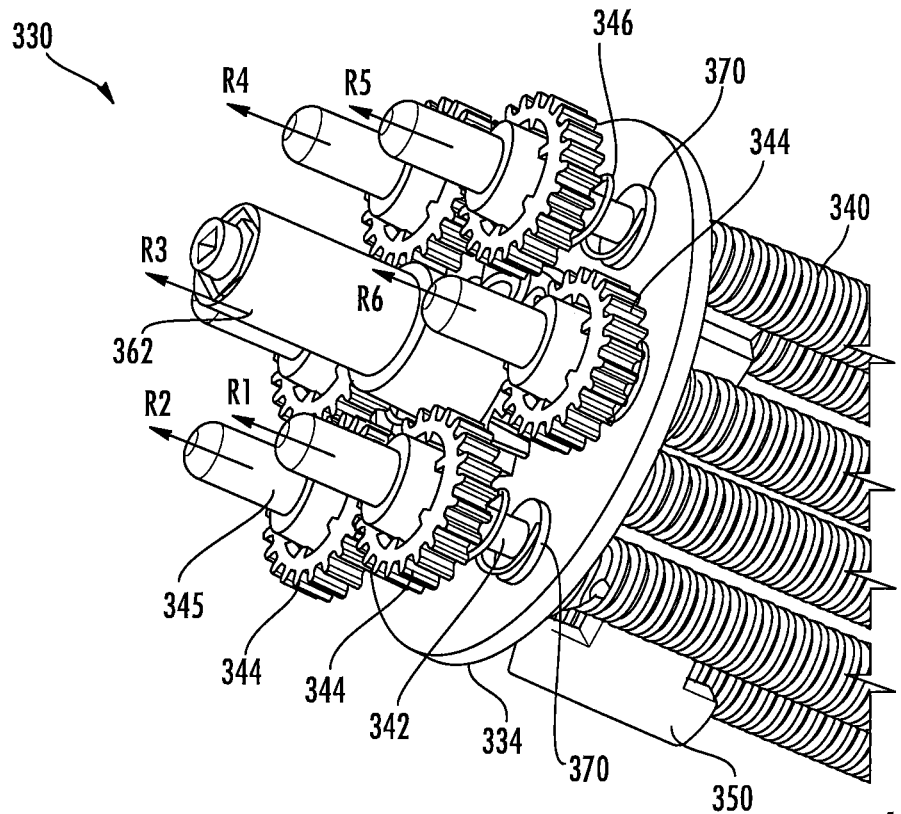
FIG. 4D is a partial side perspective view of the multi-RET actuator included in the assembly of FIG. 4A with one of the base plates and the motor removed that illustrates one of the secondary drive gears engaging the primary drive gear of the actuator.
Figure 4E:
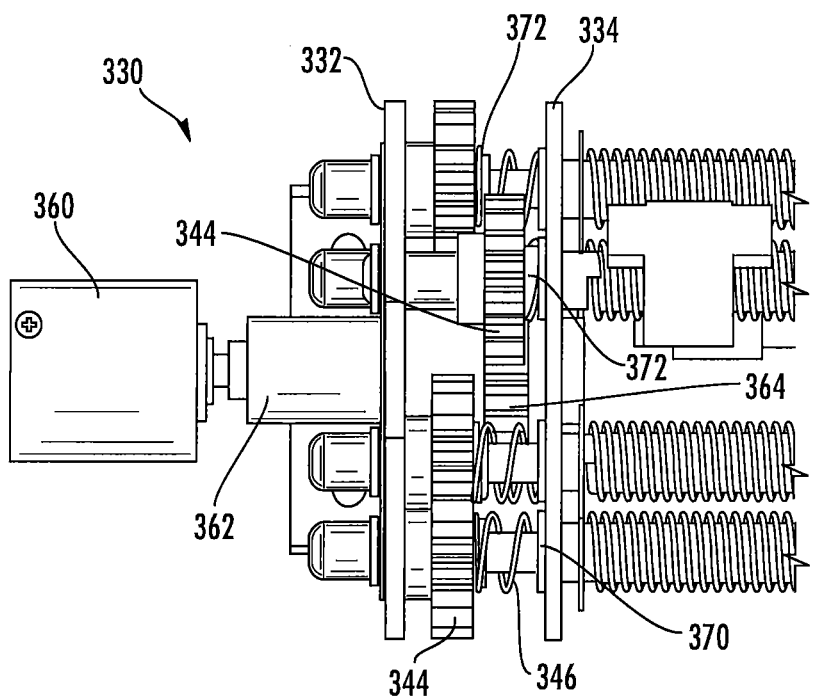
FIG. 4E is a partial side view of the multi-RET actuator of FIG. 4B that illustrates one of the secondary drive gears engaging the primary drive gear of the actuator.

Pursuant to embodiments of the present invention, multi-RET actuator assemblies are provided that include a single motor that actuates multiple mechanical linkages. By eliminating one of the two motors from the above-discussed multi-RET actuator, the size, cost and weight of the multi-RET actuator assembly may be significantly reduced. FIGS. 4A-4E illustrate a single motor multi-RET actuator assembly 300 according to embodiments of the present invention. In particular, FIG. 4A is a perspective view of the single motor multi-RET actuator 300, FIGS. 4B and 4C are a front perspective view and a side view, respectively, of the single motor multi-RET actuator 300 with the housing removed therefrom, and FIGS. 4D and 4E are partial perspective and side views of the single motor multi-RET actuator 300 with the housing removed that illustrate how one of a plurality of secondary drive gears may be selectively connected to a primary drive gear.

As shown in FIG. 4A, the multi-RET actuator assembly 300 includes a housing 310 having a pair of connectors 320 mounted on one end wall 312 of the housing 310. The housing 310 may be formed of any appropriate material, such as a metal or polymeric material. The housing 310 may be omitted in some embodiments. The connectors 320 may be mounted on a printed circuit board (not shown) in some embodiments. Each connector 320 may extend through a respective aperture 314 in the end wall 312. The connectors 320 may connect to communications cables that may be used to deliver control signals from a base station control system to the multi-RET actuator assembly 300.

Referring now to FIGS. 4B-4E, an actuator 330 is mounted within the housing behind the end wall 312. The actuator 330 includes a pair of circular base plates 332, 334 that are mounted within the housing 310. A third base plate 336 may be provided at the distal end of the actuator 330. Six generally parallel worm gear shafts 340 are provided that extend along respective axes R1-R6 between base plates 334' and 336 (see FIG. 4D). Each worm gear shaft 340 includes a worm gear extension 342 that extends through the base plate 334 so that each worm gear shaft 340 is rotatably mounted in the base plate 334. The worm gear shafts 340 are distributed generally circumferentially equidistant from each other. The worm gear extensions 342 may be formed integrally with their corresponding worm gear shafts 340. Respective secondary drive gears 344 are axially aligned with the worm gear extensions 342. Each worm gear extension 342 may extend partially into an internal cavity 347 of its respective secondary drive gear 344. In some embodiments, each worm gear extension 342 may extend into the internal cavity 347 of its respective secondary drive gear 344 when the secondary drive gear 344 is in its resting (disengaged) position. In other embodiments, the worm gear extension 342 may only extend into the internal cavity 347 of its respective secondary drive gear 344 when the secondary drive gear 344 is in its engaged position. Each internal cavity 347 extends deeper into the secondary drive gear 344 than necessary to receive the worm gear extension 342 of its mating worm gear shaft 340, which allows each secondary drive gear 344 to move axially towards its respective worm gear shaft 340, in the manner discussed below. A rear portion 345 of each secondary drive gear 344 is mounted in a respective opening in the base plate 332 so that each secondary drive gear 344 is held in place on the worm gear extension 342 of its respective worm gear shaft 340.

A spring 346 is mounted on the worm gear extension 342 of each worm gear shaft 340 between the base plate 334 and the respective secondary drive gears 344. Each secondary drive gear 344 may move axially along its respective worm gear extension 342 between the base plates 332, 334 relative to its associated worm gear shaft 340, and may also rotate in concert with its associated worm gear shaft 340, at least when the secondary drive gear 344 is in its engaged position. The springs 346 bias the secondary drive gears 344 toward base plate 332 and away from base plate 334, such that a gap exists between each secondary drive gear 344 and the base plate 334. The spring loading of the secondary drive gears 344 by the springs 346 may assist in returning the secondary drive gears 344 to their resting (disengaged) positions after the secondary drive gears 344 are moved into their engaged positions in the manner discussed below.

A piston 350 is mounted on each worm gear shaft 340. Each piston 350 may be connected to one end of a respective mechanical linkage (not shown). The mechanical linkage may prevent each piston 350 from rotating in response to rotation of its respective worm gear shaft 340. Each piston 350 may be internally threaded to mate with the external threads on its corresponding worm gear shaft 340. Each piston 350 may thus be configured to move axially relative to its associated worm gear shaft 340 along its respective axis R1-R6 upon rotation of the worm gear shaft 340. The far end of each mechanical linkage may be connected to a wiper arm of a phase shifter or a pair of phase shifters as is discussed above with reference to FIG. 3. Consequently, rotation of a worm gear shaft 340 may result in axial movement of the piston 350 mounted thereon, and this axial movement is transferred via the mechanical linkage 226 to a phase shifter in order to rotate a wiper arm of the phase shifter.

A motor 360 is mounted forward of the base plate 332. A drive shaft 362 extends from the motor 360. The motor 360 may be used to turn the drive shaft 362 to rotate about an eccentric axis R7. A primary drive gear 364 is mounted on the drive shaft 362 and may be formed integrally with the drive shaft 362 in some embodiments. The primary drive gear 364 is positioned in the center of a circle defined by the worm gear shafts 340, and is axially offset along axis R7 from the secondary drive gears 344 that are mounted on the respective worm gear extensions 342. As will be discussed in detail below, one or more of the secondary drive gears 344 may be moved axially to engage the primary drive gear 364, so that rotation of the primary drive gear 364 causes each such engaged secondary drive gear 344 to rotate, which in turn rotates the associated worm gear shafts 340, thereby resulting in axial movement of the pistons 350. Herein, when a particular secondary drive gear 344 is engaged with the primary drive gear 364, the worm gear shaft 340 that the secondary drive gear 344 that is associated therewith is said to be "selected." The primary drive gear 364 may be rotated in a first direction (e.g., clockwise) to move the pistons 350 on any selected worm gear shaft 340 away from the motor 360, and may be rotated in a second direction (e.g., counter-clockwise) to move the pistons 350 on any selected worm gear shaft 340 toward the motor 360. In this fashion, the rotational movement of the drive shaft 362 may be transformed into axial movement by one or more of the pistons 350.

As is further shown in FIGS. 4B-4E a magnet 370 and an electromagnet 372 may be mounted on (or adjacent) each worm gear extension 342, on opposite sides of the springs 346. An electromagnet refers to a magnet whose strength may be adjusted by application of an electric control signal. The polarity of an electromagnet may be reversed by reversing the polarity of the control signal. In an example embodiment, the electromagnets 372 may be connected to the secondary drive gears 344 and the magnets 370 may be connected to the base plate 334. An electric control signal may be applied to a selected one of the electromagnets 372 in response to a control signal in order to increase the strength of the "selected" electromagnet 372. As the magnetic strength is increased, the electromagnet 372 may be strongly attracted to its associated magnet 370, thereby pulling the "selected" secondary drive gear 344 toward the base plate 334 (and compressing the spring 346) so that the secondary drive gear 344 engages the primary drive gear 364. The remaining secondary drive gears 344 may remain in their "resting" (disengaged) positions and hence are spaced apart from the primary drive gear 364, and therefore are not in position to drive any of the worm gear shafts 340.

As noted above, an internal cavity 347 is provided in the rear portion 345 of each secondary drive gear 344. As the secondary drive gear 344 moves axially toward the base plate 334 in response to the electromagnet force, the worm gear extension 342 is received within this internal cavity 347. The cross-sectional shape of the internal cavity 347 may be the same as the cross-sectional shape of the portion of the worm gear extension 342 that is received therein (with the cross-sectional area of the worm gear extension 342 being slightly smaller so that the worm gear extension 342 may be received within the internal cavity 347). Accordingly, rotation of the secondary drive gear 344 will result in rotation of the worm gear extension 342, which in turn causes rotation of the worm gear shaft 340.

FIGS. 4B and 4C illustrate the default position for the actuator 330 where none of the secondary drive gears 344 are engaged with the primary drive gear 364. FIGS. 4D and 4E illustrate the positions of the gears when one of the six secondary drive gears 344 is engaged with the primary drive gear 364. Notably, since the electromagnets 372 can be controlled independently, any number of the secondary drive gears 344 may be engaged with the primary drive gear 364 at the same time. This may allow phase shifts to be implemented more quickly.

Upon receiving a signal from a controller that a phase shift in the antenna is desired, the motor 360 may be activated to rotate the primary drive gear 364 about the axis R7. Rotation of the primary drive gear 364 rotates the engaged secondary drive gear 344 about its respective axis (in the example of FIGS. 4D-4E, axis R6), which in turn rotates the worm gear shaft 340 associated with the secondary drive gear 344 about the axis R6. Rotation of the worm gear shaft 340 drives the piston 350 axially along its associated worm gear shaft 340 until the piston 350 reaches a desired position, at which point the motor 360 deactivates.

Notably, the actuator assembly 300 is capable of adjusting up to six phase shifters 150, which is a typical number for a base station antenna, which often include two high band arrays and one low band array, with each array having a transmit phase shifter and a receive phase shifter for each of two polarizations, for a total of four phase shifters per linear array or twelve phase shifters total. Since a single RET actuator may control both polarizations, a total of six RET actuators are required for such an antenna.

It will be appreciated that numerous modifications may be made to the actuator assembly 300. For example, the one or more of the pistons 350 may be replaced by another axially-drivable member. The primary drive gear 364 may be any type of central drive gear, or even another variety of a central drive member, such as a wheel or disc that frictionally engages the secondary drive gears 344. Similarly, the secondary drive gears 344 may be replaced with another rotary member, such as a wheel or disc that engages the primary drive member 364. The number of worm gear shafts 340 (and associated structures) may be increased or decreased from six as appropriate depending upon the number of phase shifters that need to be controlled. Numerous other modifications are possible.

FIGS. 5A-5E, 6 and 7 illustrate single motor multi-RET actuators according to further embodiments of the present invention.

Figure 5A:
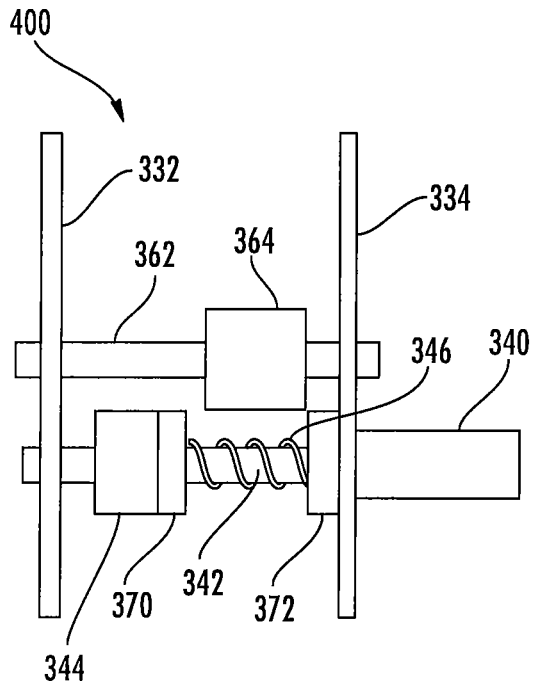
FIG. 5A is a schematic block diagram of a single motor multi-RET actuator according to further embodiments of the present invention.

FIG. 5A is a schematic block diagram of a portion of a single motor multi-RET actuator 400 that is similar to the single motor multi-RET actuator 330 that is discussed above with reference to FIGS. 4A-4E. However, in the multi-RET actuator 400, the positions of one or more of the electromagnets 372 and the permanent magnets 370 are reversed. This is shown schematically in FIG. 5A, which uses a block diagram format to illustrate the base plates 332, 334, the drive shaft 362 with the primary drive gear 364 mounted thereon, one of the worm gear shafts 340 with a secondary drive gear 344 mounted on the extension 342 thereof. Various other elements of the multi-RET actuator 400 are not depicted in FIG. 5A such as the other worm gears 340 and their associated secondary drive gears 344 and springs 346, the motor 360, the pistons 350, etc. in order to simplify the drawing. The multi-RET actuator 400 may move a selected one of the secondary drive gears 344 into an engagement with the primary drive gear 364 by applying a control signal to the electromagnet 372 that increases the magnetism of the electromagnet 372 in order to attract the permanent magnet 370 toward the electromagnet 372, thereby moving a selected one of the secondary drive gears 344 into engagement with the primary drive gear 364.

Figure 5B:
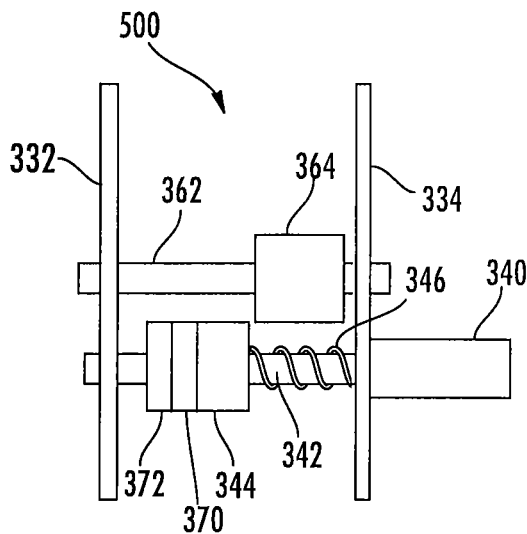
FIGS. 5B and 5C are schematic block diagrams of a single motor multi-RET actuator according to still further embodiments of the present invention that illustrate a secondary drive gear thereof in its disengaged and engaged positions, respectively.
Figure 5C:
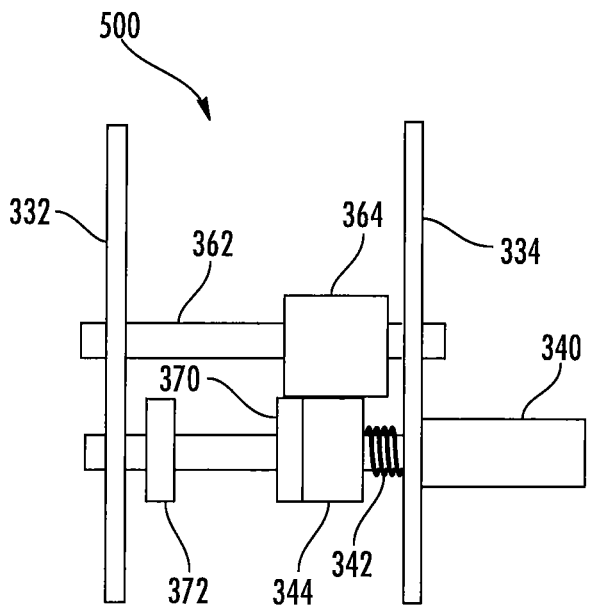

It will also be appreciated that the electromagnet 372 may be configured to repel the permanent magnet 370 by switching the polarity of the control signal supplied to the electromagnet. When a repelling force is used as opposed to an attractive force, the configuration of the electromagnet 372, the permanent magnet 370 and each secondary drive gear 344 may be changed. FIGS. 5B and 5C are schematic block diagrams of a portion of a single motor multi-RET actuator 500 according to still further embodiments of the present invention that illustrate how a repelling force may be used in other embodiments of the present invention.

As shown in FIG. 5B, the multi-RET actuator 500 may be similar to the multi-RET actuator 400, except that the electromagnet 372 and the permanent magnet 370 are moved to the other side of the secondary drive gear 344. The permanent magnet 370 may be mounted on or otherwise connected to the secondary drive gear 344 so that axial movement of the permanent magnet 370 results in axial movement of the secondary drive gear 344. The spring 346 may bias the permanent magnet 370 (and hence the secondary drive gear 344) toward the electromagnet 372. As shown in FIG. 5B, in this position, the secondary drive gear 344 is disengaged from the primary drive gear 364. When a control signal is applied to the electromagnet 372, a magnetism of the electromagnet 372 may be greatly increased. The electromagnet 372 is oriented so that the magnetic force repels the permanent magnet 370. This repulsive magnetic force may exceed the counter-acting bias force applied by the spring 346, and hence, as shown in FIG. 5C, when the electromagnet 372 is activated by the control signal, the secondary drive gear 344 is moved into engagement with the primary drive gear 364 so that rotational movement of the primary drive gear 364 results in rotational movement of the secondary drive gear 344 (and hence rotation of the worm gear shaft 340).

Figure 5D:
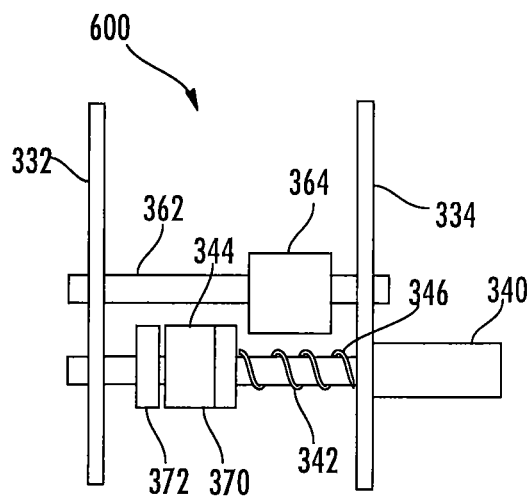
FIG. 5D is a schematic block diagram of a single motor multi-RET actuator according to yet additional embodiments of the present invention.

FIG. 5D is a schematic block diagram of a single motor multi-RET actuator 600 that is very similar to the multi-RET actuator 500, with the only difference being that the permanent magnet 370 has been moved to the other side of the secondary drive gear 344. The multi-RET actuator 600 may operate identically to the multi-RET actuator 500, but this modified embodiment is depicted to make clear that the positions of the electromagnet 372 and/or the permanent magnet 370 may be changed without materially effecting operation of the device. It will also be appreciated that if the secondary drive gear 344 (or something attached thereto) is formed of a ferromagnetic material, the permanent magnet 370 may be omitted in any of the embodiments disclosed herein. Alternatively, the permanent magnets 370 in any of the embodiments disclosed herein may be replaced with a structure that is formed of or includes a ferromagnetic material that is attracted (or repelled, depending upon the orientation) from the electromagnet 372 when the electromagnet is activated. The ferromagnetic structure may have the same shape as the permanent magnet 370 or may have a different shape. The use of such ferromagnetic materials may be advantageous in some embodiments as it may reduce or eliminate any crosstalk between magnets that are in close proximity to each other, and also will reduce the possibility that other structures in the actuator are unintentionally magnetized such as the lead screw.

Figure 5E:
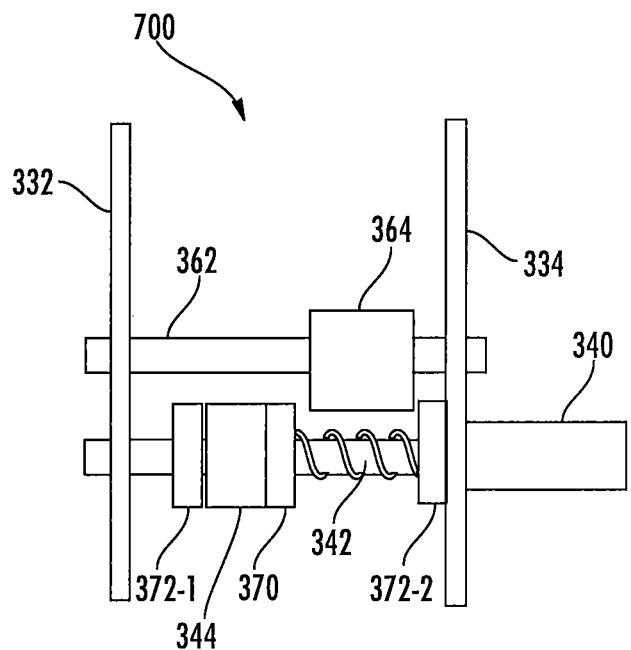
FIG. 5E is a schematic block diagram of a single motor multi-RET actuator according to yet further embodiments of the present invention.

FIG. 5E is a schematic block diagram of a single motor multi-RET actuator 700 that is very similar to the multi-RET actuator 600 of FIG. 5D, with the only difference being that an additional electromagnet 372 is provided adjacent the base plate 334. The two electromagnets 372 are labelled 372-1 and 372-2 for ease of description of this embodiment. The electromagnet 372-1 may impart a repulsive force on the permanent magnet 370 in response to a control signal, while the electromagnet 372-2 may impart an attractive force on the permanent magnet 370 so that the two electromagnets 372-1, 372-2 work together to overcome the bias force of the spring 346 that is mounted on the worm gear extension 342 in order to move the secondary gear 344 into engagement with the primary drive gear 364.

Figure 6:
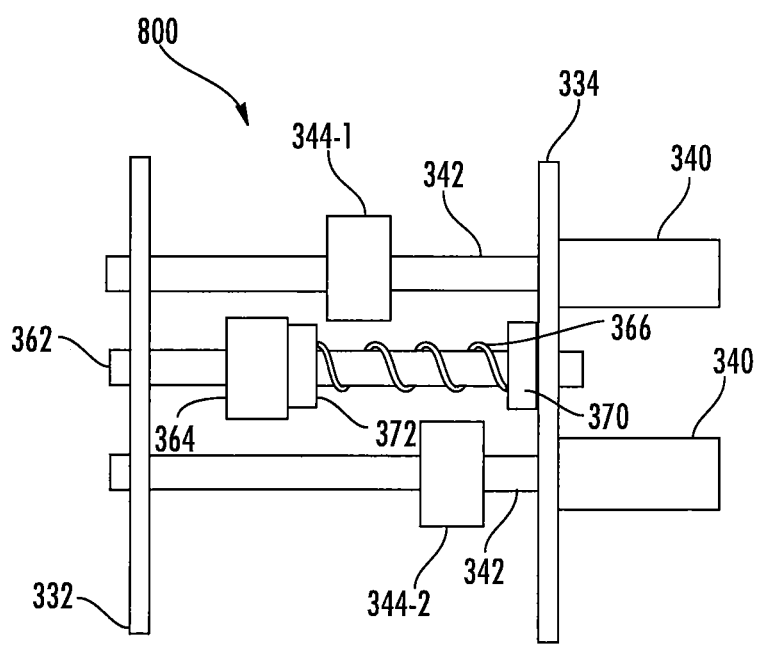
FIG. 6 is a schematic block diagram of a single motor multi-RET actuator according to embodiments of the present invention in which the primary drive gear is moved as opposed to the secondary drive gears.

In the above-described embodiments, electromagnets are provided that are used to selectively move one or more of the secondary drive gears 344 into engagement with the primary drive gear 364. Pursuant to further embodiments of the present invention, the primary drive gear 364 may instead be moved into engagement with a selected one of the secondary drive gears 344. FIG. 6 is a schematic block diagram of a single motor multi-RET actuator 800 according to embodiments of the present invention in which the primary drive gear 364 is moved as opposed to the secondary drive gears 344. To simplify the figure, only two of the worm gear shafts 340 and their associated extensions 342 and secondary drive gears 344 are illustrated in FIG. 6. It will be appreciated, that more than two worm gear shafts 340 and their associated elements may be provided. As shown in FIG. 6, the two secondary drive gears 344 are axially offset from each other so that when the primary drive gear 364 is engaged with one of the secondary drive gears 344 it is not engaged with the other of the secondary drive gears 344. If more than two secondary drive gears 344 are provided, the additional secondary drive gears 344 may likewise be axially offset from each of the other secondary drive gears 344.

As shown in FIG. 6, the electromagnet 372 is mounted on the primary drive gear 364 while the permanent magnet 370 is mounted on or adjacent the base plate 334. A control signal may be applied to the electromagnet 372 to increase the magnetism thereof so that the electromagnet 372 is attracted to the permanent magnet 370, thereby pulling the electromagnet 372 (and the primary drive gear 364) axially along the drive shaft 362. The drive shaft 362 may, for example, have a transverse cross-section that is non-circular such as, for example, a square transverse cross-section. This may allow the primary drive gear 364 to move axially along the drive shaft 362 while also ensuring that rotation of the drive shaft 362 will result in rotation of the primary drive gear 364. Different control signals may be used depending upon which of the secondary drive gears 344 is to be selected. For example, if the primary drive gear 364 is to engage the secondary drive gear 344-1, then the electromagnet 372 may be caused to exhibit a first level of electromagnetic force that is sufficient to move the primary drive gear 364 to compress the spring 366 a first amount so that the primary drive gear 364 engages secondary drive gear 344-1. If the primary drive gear 364 is to engage the secondary drive gear 344-2, then the electromagnet 372 may be caused to exhibit a second, greater, level of electromagnetic force that is sufficient to move the primary drive gear 364 to compress the spring 366 a second amount so that the primary drive gear 364 engages secondary drive gear 344-2. The secondary drive gears 344 may be offset by axial amounts that are sufficient so that variation in the attraction force between the electromagnet 372 and the permanent magnet 370 and or variation in the bias force of the spring 366 that may occur over time due to aging of components or due to other magnetic, friction or other forces is sufficient so that the primary drive gear 364 will always engage the selected one of the secondary drive gears 344.

In the embodiment of FIG. 6, it may be necessary for the primary drive gear 364 to move a greater distance, particularly if the multi-RET actuator 800 includes a relatively large number of secondary drive gears 344 (e.g., 6). This may require the use of a more powerful electromagnet 372 and/or a more powerful permanent magnet 370. Additionally, the technique described above where two electromagnets 372 may also be used. It will also be appreciated that the positions of the electromagnets 372 and the permanent magnets 370 may be varied in the manner discussed above with reference to FIGS. 5A-5E in the embodiment of FIG. 6.

Figure 7:
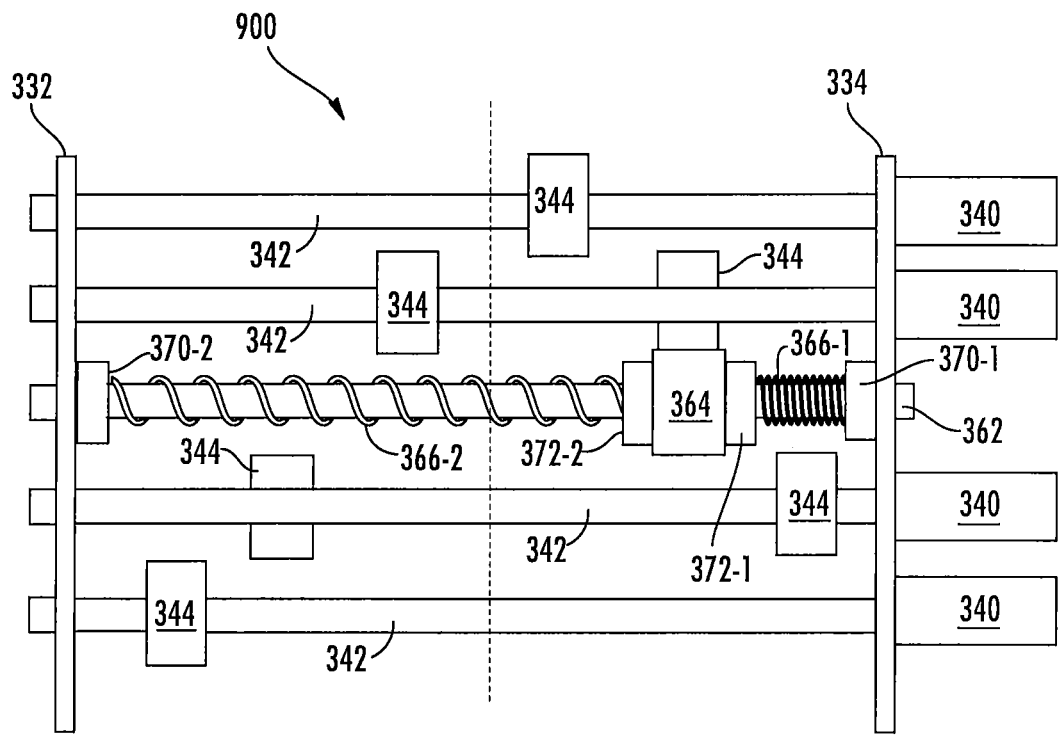
FIG. 7 is a schematic block diagram of a single motor multi-RET actuator according to further embodiments of the present invention that has a primary drive gear that can be moved in two different directions via application of electromagnetic force.

FIG. 7 is a schematic block diagram of a single motor multi-RET actuator 900 according to further embodiments of the present invention that has a primary drive gear 364 that may be moved in two different directions along the drive shaft 362 in order to reduce the amount of electromagnetic force that may be necessary in operation.

As shown in FIG. 7, the single motor multi-RET actuator 900 is similar to the single motor multi-RET actuator 800 of FIG. 6, except that the multi-RET actuator 900 includes an additional spring 366 (the two springs are labeled 366-1 and 366-2 in FIG. 7), an additional electromagnet 372 (the two electromagnets are labeled 372-1 and 372-2 in FIG. 7) and an additional permanent magnet 370 (the two permanent magnets are labeled 370-1 and 370-2 in FIG. 7). In FIG. 7, the multi-RET actuator is illustrated as including a total of six worm gear shafts 340 and associated elements (e.g., secondary drive gears 344) to better illustrate the operation thereof. Note that only four of the worm gear shafts 340 and worm gear extensions 342 are visible in FIG. 7 because of the side view, although the secondary drive gears 344 that are associated with the hidden worm gear shafts 340 are visible. It will be appreciated that the multi-RET actuator 900 may include a different number of worm gear shafts 340.

In its resting position, the primary drive gear 364 may be axially located at approximately a midpoint between the base plates 332, 334. As shown in FIG. 7, three of the secondary drive gears 344 are located axially to the left of the midpoint, while the other of the secondary drive gears 344 are located axially to the right of the midpoint. A spring 366-1 is mounted on the drive shaft 362 to the right of the midpoint, and a spring 366-2 is located on the drive shaft 362 to the left of the midpoint. The electromagnets 372-1, 372-2 are mounted on the primary drive gear 364 while the permanent magnets 370-1, 370-2 are mounted at the far ends of the respective springs 366-1, 366-2 from the primary drive gear 364.

If, for example, a phase shifter attached via a mechanical linkage to a worm gear shaft 340 associated with one of the secondary drive gears 344 that is to the left of the midpoint needs adjustment, a controller (not shown) may send a control signal to the electromagnet 372-2 to increase the attractive force between electromagnet 372-2 and permanent magnet 370-2. As a result, the primary drive gear 364 may move to the left, compressing spring 366-2 to a degree, so that the primary drive gear 364 engages the desired secondary drive gear 344. If instead a phase shifter attached via a mechanical linkage to the worm gear shaft 340 associated with one of the secondary drive gears 344 that are to the right of the midpoint needs adjustment, then electromagnet 372-1 may be supplied a control signal so that a magnetic force is generated that moves the primary drive gear 364 to the right to engage the desired secondary drive gear 344, which is the situation shown in FIG. 7. In each of the above cases, both electromagnets 372-1 and 372-2 may be used to move the primary drive gear 364 by controlling one of the electromagnets 372 to generate an attractive magnetic force and the other to generate a repelling magnetic force in a manner similar to the discussion of the embodiment of FIG. 5E above.

While electromagnetic force provides one mechanism for moving the primary drive gear 364 into engagement with a selected one of the secondary drive gears 344, or vice versa, it will be appreciated that embodiments of the present invention are not limited to the use of such electromagnetic forces. Instead, embodiments of the present invention extend to any mechanical force that may be applied in response to a control signal. For example, FIG. 8 is a schematic block diagram of a single motor multi-RET actuator 1000 according to still further embodiments of the present invention that uses a piezoelectric actuator to connect a selected mechanical linkage to a motor.

Figure 8:
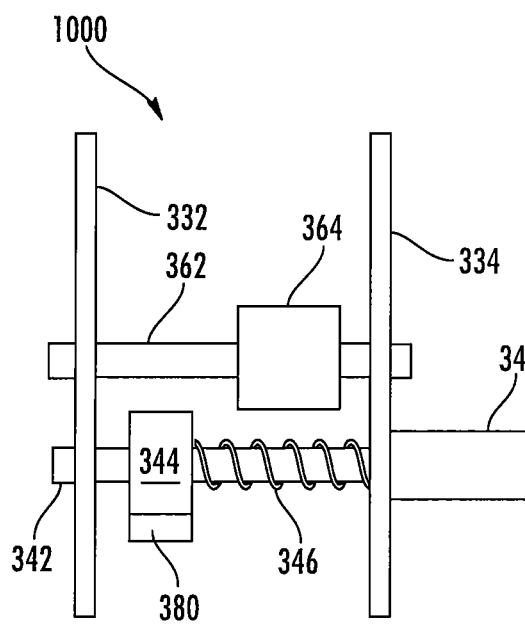
FIG. 8 is a schematic block diagram of a single motor multi-RET actuator according to further embodiments of the present invention that uses a piezoelectric actuator to connect a selected mechanical linkage to a motor.

As shown in FIG. 8, the multi-RET actuator 1000 may be similar to the multi-RET actuator 400 of FIG. 5A, except that the electromagnet 372 and permanent magnet 370 are replaced with a piezoelectric actuator 380. Piezoelectric actuators are known in the art and use the piezoelectric effect to effect a physical movement. The piezoelectric effect refers to an electric charge that may accumulate in certain solid materials such as crystals in response to applied mechanical stress. The piezoelectric effect is thus a linear electromechanical interaction between the mechanical and the electrical state in crystalline materials. The piezoelectric effect is a reversible process in that materials exhibiting the direct piezoelectric effect (the internal generation of electrical charge resulting from an applied mechanical force) also exhibit the reverse piezoelectric effect (the internal generation of a mechanical strain resulting from an applied electrical field). Piezoelectric actuators apply an electrical field to generate a mechanical strain.

A separate piezoelectric actuator 380 may be provided for each of the secondary drive gears 344 and may be configured to move the respective secondary drive gears 344 into engagement with the primary drive gear 364 in response to respective control signals. While only one embodiment of the present invention is illustrated in the figures that includes a piezoelectric actuator 380, it will be appreciated that the electromagnets/permanent magnets 372/370 of each of the other embodiments disclosed herein may be replaced with piezoelectric actuators to provide a plurality of additional embodiments.

Piezoelectric actuators tend to only provide a small amount of physical, mechanical movement (often referred to as "stroke"), which can be a limitation in some applications. For example, a typical piezoelectric material may only provide 0.1% strain, meaning that a 1 meter piece of piezoelectric material may be required to obtain a stroke of 1 mm. Amplified piezoelectric actuators may be used to mitigate this limitation in some embodiments.

It will be appreciated that numerous modifications may be made to the above-described example embodiments without departing from the scope of the present invention. As one example, the above described embodiments implement the primary drive gear as a central gear and the secondary drive gears as gears that circumferentially surround the central primary drive gear. It will be appreciated that in other embodiments the secondary drive gears may only partially circumferentially surround a central primary drive gear, or that the drive gears may have a different arrangement such as the secondary drive gears being linearly arranged. In such an embodiment the central drive gear could move to engage a respective one of the secondary drive gears or an intermediate gear that is engaged with the primary drive gear could move to engage a selected on of the secondary drive gears. Numerous other arrangements are possible. In each case an electromagnetic engagement mechanism and/or a piezoelectric engagement mechanism may be used to move one or more of the gears so that the primary drive gear may rotate a selected one (or more) of the secondary drive gears.

Pursuant to further embodiments of the present invention, multi-RET actuator assemblies are provided that include a main motor and a plurality of small "micro-motors" that are used together to, for example, serially actuate multiple mechanical linkages. While these multi-RET assemblies increase the total number of motors used, the six micro-motors may be less expensive than a single conventional motor, and the micro-motors may be highly reliable and hence may involve less risk of failure in the field as compared to some other options. FIGS. 9A-9E illustrate a multi-RET actuator 1130 that may be used as part of such a multi-RET actuator assembly. While FIGS. 9A-9E only depict the multi-RET actuator 1130, it will be appreciated that the multi-RET actuator may be incorporated, for example, into the multi-RET actuator assembly 300 of FIG. 4A in place of the multi-RET actuator 330.

Figure 9D:
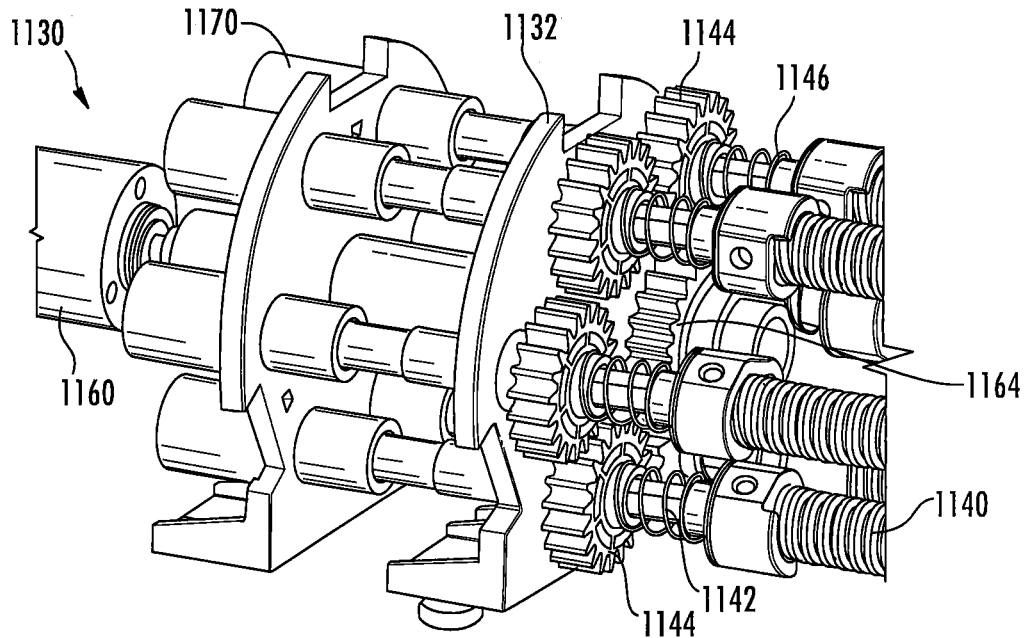
FIG. 9D is a partial side perspective view of the multi-RET actuator of FIG. 9A with none of the secondary drive gears engaged with the primary drive gear.
Figure 9E:
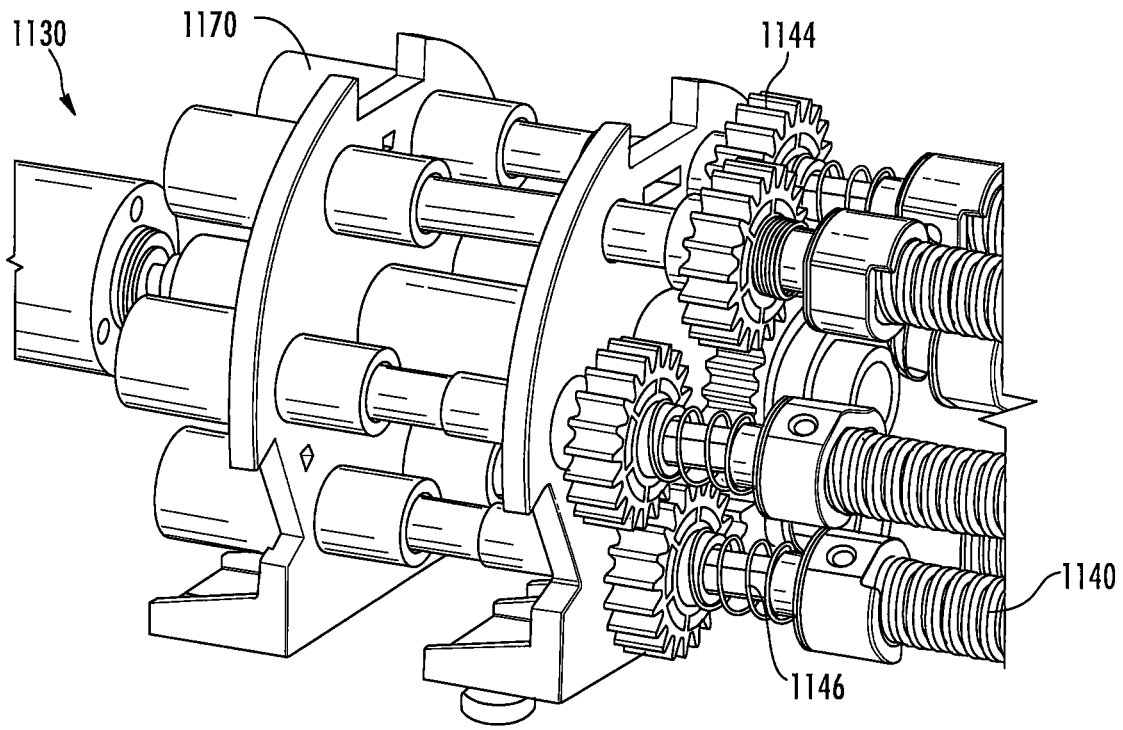
FIG. 9E is a partial side perspective view of the multi-RET actuator of FIG. 9A with one of the secondary drive gears engaged with the primary drive gear.

Referring now to the figures, FIG. 9A is a side view of the multi-RET actuator 1130, FIG. 9B is an enlarged, partial side view of the multi-RET actuator 1130 with one of the secondary drive gears thereof engaged with the primary drive gear, FIG. 9C is a partial side sectional view of the multi-RET actuator 1130, FIG. 9D is a partial side perspective view of the multi-RET actuator 1130 with none of the secondary drive gears engaged with the primary drive gear, and FIG. 9E is a partial side perspective view of the multi-RET actuator 1130 with one of the secondary drive gears engaged with the primary drive gear.

Referring first to FIGS. 9A, 9C and 9D, the multi-RET actuator 1130 includes a pair of circular base plates 1132, 1134 that may be mounted within a housing (not shown) of the multi-RET actuator assembly (e.g., within housing 310 of multi-RET actuator assembly 300). A third base plate 1136 is provided at the distal end of the actuator 1130. The base plates 1132, 1134, 1136 may be identical to the base plates 332, 334, 336 of multi-RET actuator 330 and hence further description thereof will be omitted herein. Six generally parallel worm gear shafts 1140 are provided that extend along respective generally parallel axes between base plates 1134 and 1136. Each worm gear shaft 1140 includes a worm gear extension 1142 that is rotatably mounted in the base plate 1134. A secondary drive gear 1144 is axially aligned with each worm gear extension 1142. As shown best in FIG. 9C, each worm gear extension 1142 may extend partially into an internal cavity 1147 of its associated secondary drive gear 1144. Each internal cavity 1147 extends deeper into the secondary drive gear 1144 than necessary to receive the worm gear extension 1142 of its mating worm gear shaft 1140, which allows each secondary drive gear 1144 to move axially towards its associated worm gear shaft 1140. A rod-like rear portion of each secondary drive gear 1144 is mounted in a respective opening in the base plate 1132. A spring 1146 is mounted on each worm gear extension 1142. Each secondary drive gear 1144 may move axially along its respective worm gear extension 1142, and may also rotate in concert with its associated worm gear shaft 1140 when the secondary drive gear 1144 is in its engaged position so that it engages the primary drive gear 1164. The springs 1146 bias the secondary drive gears 1144 toward base plate 1132. The worm gear shafts 1140, worm gear extensions 1142, secondary drive gears 1144 and springs 1146 may be identical to the corresponding worm gear shafts 340, worm gear extensions 342, secondary drive gears 344 and springs 346 of multi-RET actuator 330 and hence further description thereof will be omitted herein.

An internally threaded piston 1150 is mounted on each externally threaded worm gear shaft 1140. Each piston 1150 may be connected to a respective mechanical linkage (not shown). When a selected one of the worm gear shafts 1140 is rotated, the mechanical linkage that is connected to the piston 1150 that is mounted on the selected worm gear shaft 1140 prevents the piston 1150 from rotating. As the externally threaded worm gear shaft 1140 rotates, the piston 1150 moves axially relative to the worm gear shaft 1140 along the axis of rotation of the worm gear shaft 1140, which in turn imparts the same axial movement to the mechanical linkage that is connected to the piston 1150. The far end of each mechanical linkage may be connected to a phase shifter or a pair of phase shifters such as the phase shifters of FIG. 3. Thus, rotation of a worm gear shaft 1140 may impart axial movement to the piston 1150 and its associated mechanical linkage 226 that is used to rotate a wiper arm of a phase shifter.

A main motor 1160 is mounted forward of the base plate 1132. A drive shaft 1162 extends from the main motor 160. The main motor 1160 may be used to rotate the drive shaft 1162. A primary drive gear 1164 is mounted on the drive shaft 1162 and may be formed integrally with the drive shaft 1162. The primary drive gear 1164 is positioned in the center of a circle defined by the worm gear shafts 1140, and is axially offset from the secondary drive gears 1144. The secondary drive gears 1144 may be moved axially to engage the primary drive gear 1164, so that rotation of the primary drive gear 1164 rotates each engaged secondary drive gear 1144, which in turn rotates the associated worm gear shafts 1140, thereby resulting in axial movement of the pistons 1150.

As is further shown in FIGS. 9A, 9C and 9D a micromotor 1170 is mounted on each of the secondary drive gears 1144 forwardly of base plate 1132. The micro-motors 1170 may be small and relatively inexpensive. Each micro-motor 1170 has an associated externally threaded drive shaft 1172 that rotates when its associated micro-motor 1170 is activated. The drive shafts 1172 may be rotated clockwise or counter-clockwise by the micro-motors 1170. An internally threaded piston 1174 is mounted on each externally threaded drive shaft 1172. A rear end of each piston 1174 is attached to a front portion of a respective one of the secondary drive gears 1144. When one of the micro-motors 1170 rotates in, for example, the clockwise direction, the piston 1174 mounted thereon moves rearwardly along the axis of the drive shaft 1172. This can best be seen in FIG. 9C, where the piston 1174-1 is shown in its retracted position while piston 1174-2 has been moved rearwardly into an extended position by activation of micro-motor 1170-2. As piston 1174-2 moves rearwardly, it pushes secondary drive gear 1144-2 rearwardly as well, compressing the spring 1146-2, so that the geared portion of secondary drive gear 1144-2 engages the primary drive gear 1164. As the secondary drive gear 1144-2 is pushed axially toward the base plate 1134 by the micro-motor 1170-2, the worm gear extension 1142-2 is received within the internal cavity 1147 in secondary drive gear 1144-2. The remaining secondary drive gears 1144 may remain in their "resting" (disengaged) positions and hence are spaced apart from the primary drive gear 1164.

Upon receiving a signal from a controller that a phase shift in the antenna is desired, the motor 1160 may be activated to rotate the primary drive gear 1164. Rotation of the primary drive gear 1164 rotates the engaged secondary drive gear 1144-2 about its respective axis. The cross-sectional shape of the internal cavity 1147 may be the same as the cross-sectional shape of the portion of the worm gear extension 1142-2 that is received therein so that rotation of the selected secondary drive gear 1144-2 by the primary drive gear 1164 results in rotation of the worm gear extension 1142-2, which in turn causes rotation of the worm gear shaft 1140-2. Rotation of the worm gear shaft 1140-2 drives the piston 1150 mounted thereon axially until it reaches a desired position, at which point the motor 1160 is deactivated.

It should be noted that multiple of the secondary drive gears 1144 may be moved into their engaged positions at the same time so that the main drive gear 1164 may move multiple of the pistons 1150 simultaneously. This may allow phase shifts to be implemented more quickly.

FIGS. 9A and 9D illustrate the default position for the multi-RET actuator 1130 where none of the secondary drive gears 1144 are engaged with the primary drive gear 1164. FIGS. 9B, 9C and 9E illustrate the positions of the gears when one of the six secondary drive gears 1144 is engaged with the primary drive gear 1164.

It will be appreciated that numerous modifications may be made to the multi-RET actuator 1130, including the modifications discussed above with respect to multi-RET actuator 330.

Figure 10A:
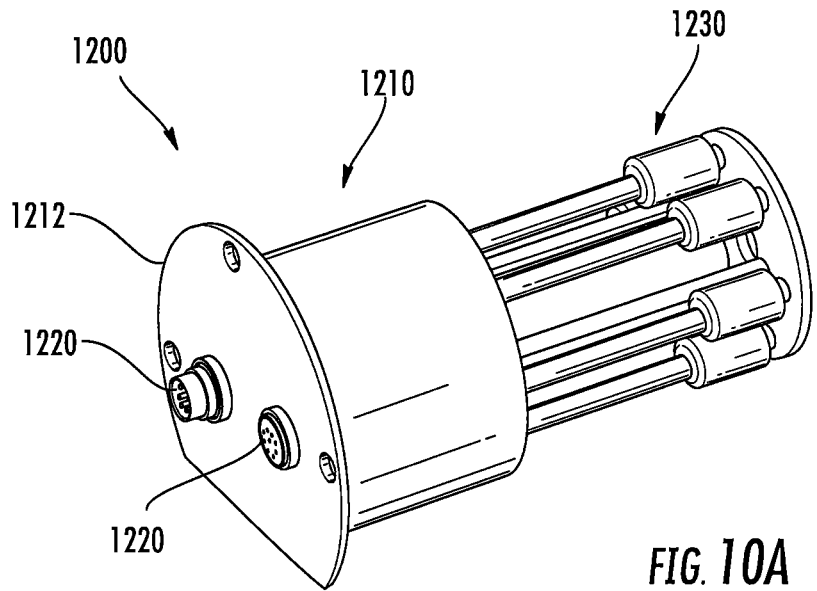
FIG. 10A is perspective view of a multi-RET actuator assembly according to further embodiments of the invention.
Figure 10B:
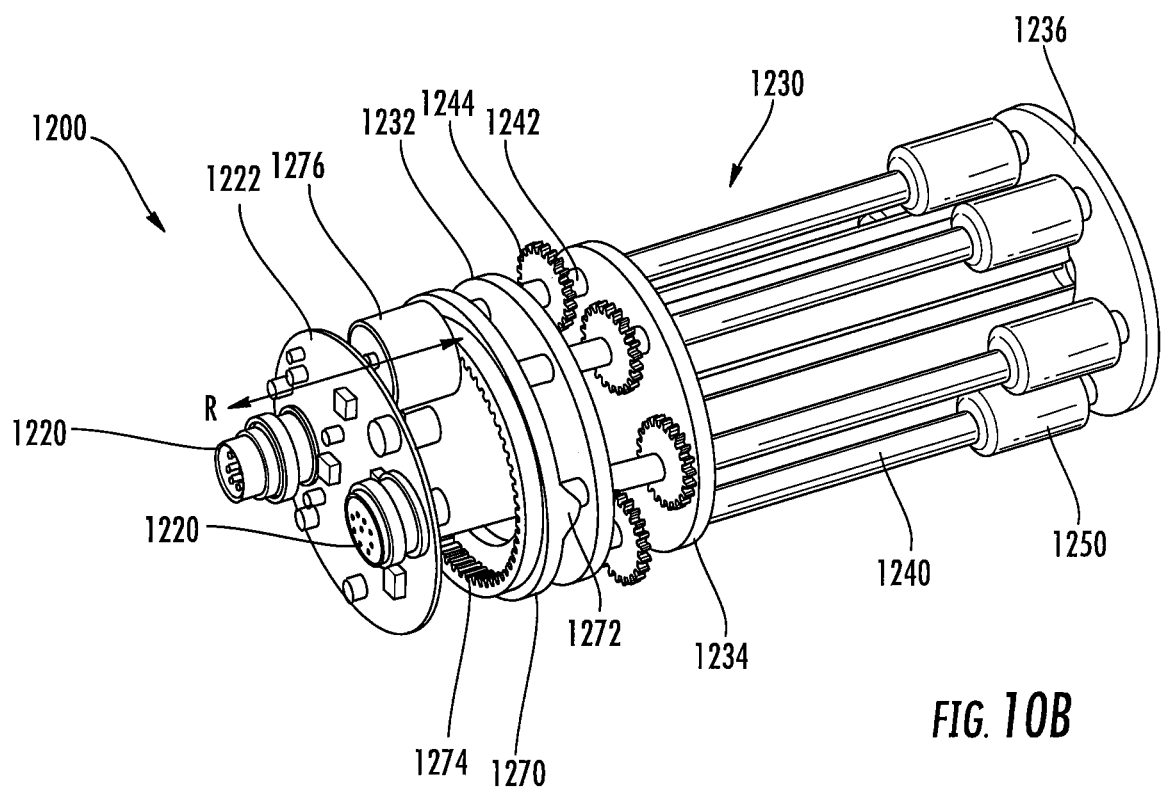
FIG. 10B is a perspective view of the multi-RET actuator of FIG. 10A with the housing removed therefrom.
Figure 10C:
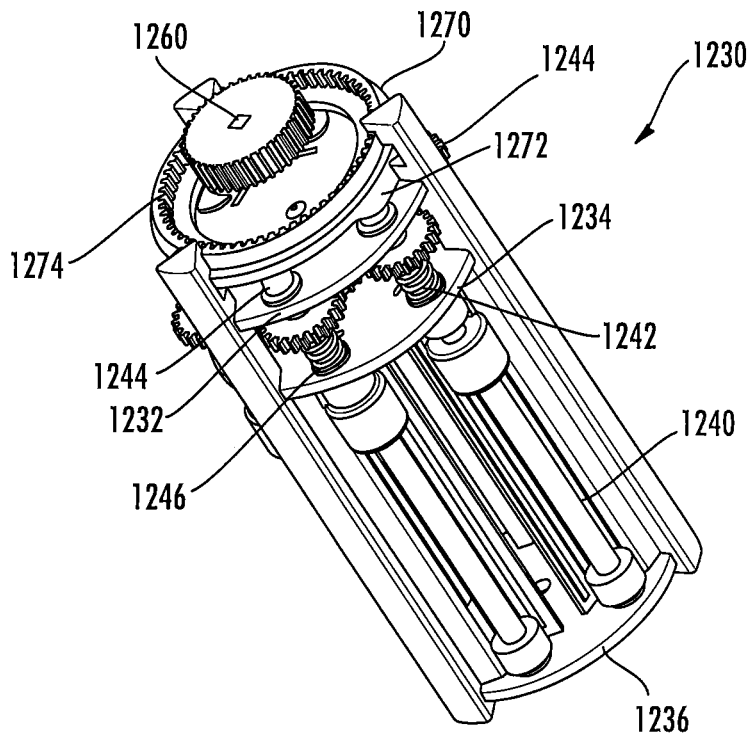
FIG. 10C is a perspective view of the actuator included in the multi-RET actuator assembly of FIGS. 10A-10B.
Figure 10D:
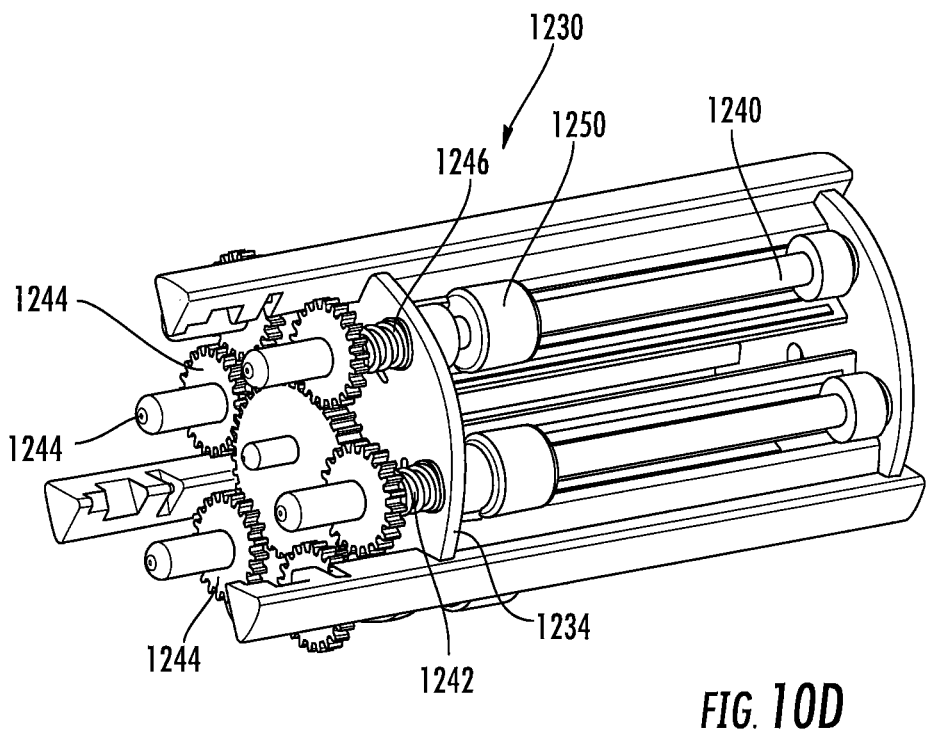
FIG. 10D is a perspective view of the actuator of FIG. 10C with the motors, cam plate and one base plate removed.
Figure 10E:
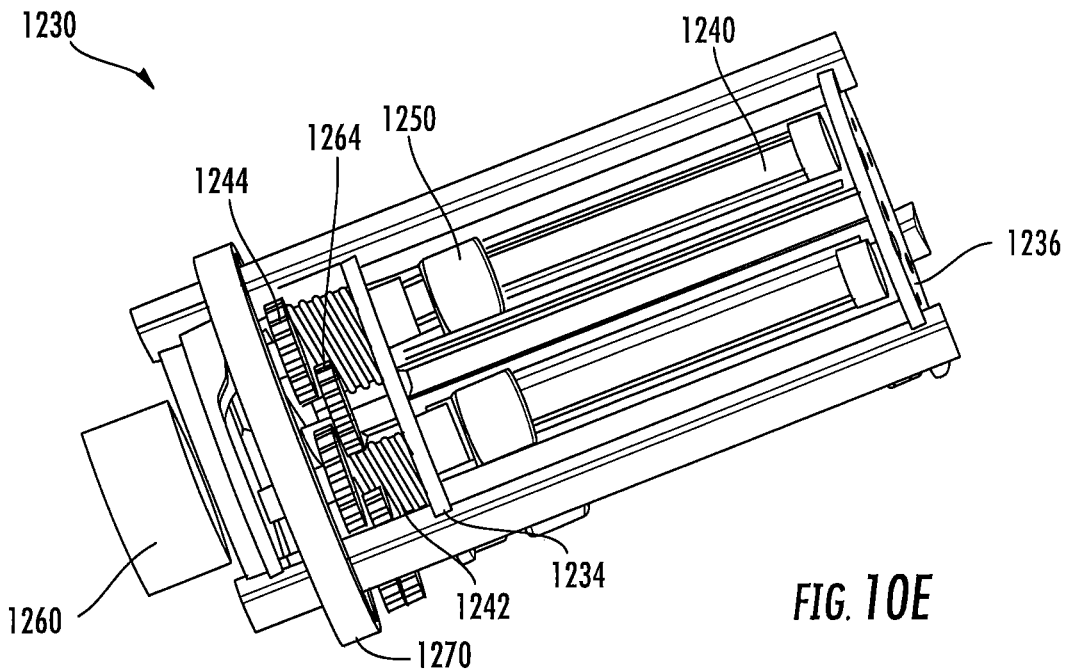
FIG. 10E is a side view of the actuator of FIG. 10C.
Figure 10F:
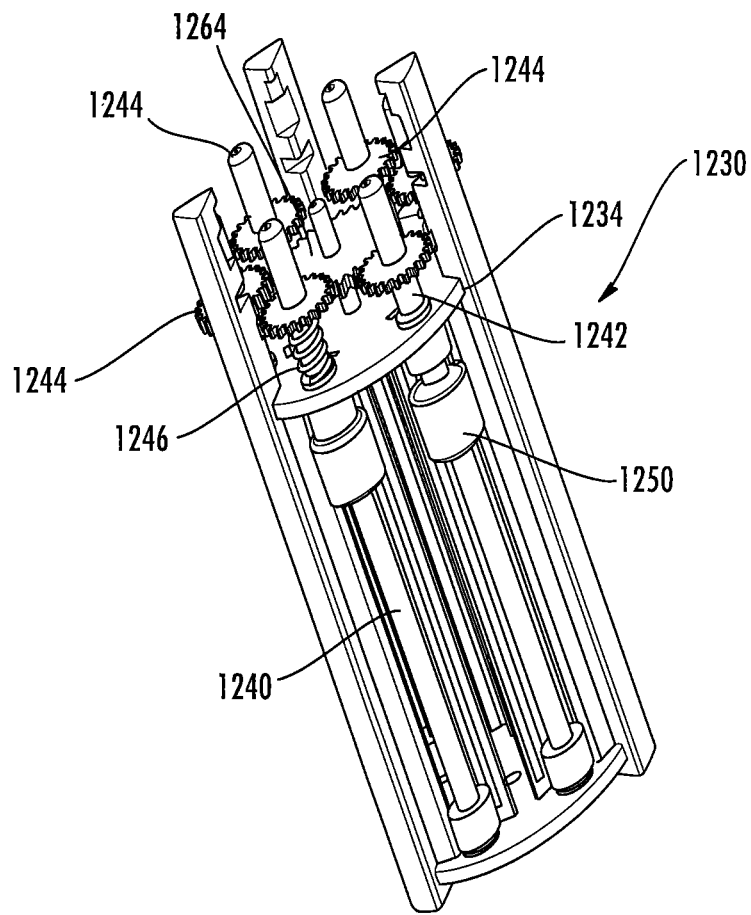
FIG. 10F is another perspective view of the actuator of FIG. 10C with the motors, cam plate and one base plate removed.

Pursuant to yet additional embodiments of the present invention, multi-RET actuator assemblies are provided that use a drive motor and a stepper motor to actuate multiple mechanical linkages. Examples of such embodiments are depicted in FIGS. 10A-10F. In particular, FIG. 10A is perspective view of a multi-RET actuator assembly 1200 according to further embodiments of the invention. FIG. 10B is a perspective view of the multi-RET actuator 1200 with the housing removed therefrom. FIG. 10C is a perspective view of a multi-RET actuator 1230 that is included in the multi-RET actuator assembly 1200 of FIGS. 10A-10B. FIG. 10D is a perspective view of the multi-RET actuator 1230 with the motors, cam plate and one base plate removed. FIG. 10E is a side view of the multi-RET actuator 1230. FIG. 10F is another perspective view of the actuator 1230 with the motors, cam plate and one base plate removed.

The multi-RET actuator assembly 1200 is shown in FIG. 10A. The actuator assembly 1200 includes a housing 1210 with a pair of connectors 1220 mounted on one end wall 1212 thereof and a multi-RET actuator 1230 is mounted within the housing 1210. The housing 1210 may be formed of any appropriate material, such as a metal or polymeric material.

Referring to FIG. 10B, the connectors 1220 may be mounted on a printed circuit board 1222 in some embodiments. The circuit board 1222 is mounted next to the end wall 1212 so that the connectors 1220 extend through the end wall 1212. The connectors 1220 may connect to communications cables that may be used to deliver control signals from a base station control system to the multi-RET actuator assembly 1200.

Referring now to FIGS. 10B-10F, the actuator 1230 includes a pair of circular base plates 1232, 1234 that are mounted within the housing 1210. A third base plate 1236 may be provided at the distal end of the assembly 1200. Six generally parallel worm gear shafts 1240 are provided that extend along respective axes between base plates 1234 and 1236. The worm gear shafts 1240 are distributed generally circumferentially equidistant from each other.

Each worm gear shaft 1240 has a worm gear extension 1242 extending from the forward end thereof through base plate 1234. Each worm gear extension 1242 may be formed integrally with its corresponding worm gear shaft 1240. Each worm gear shaft 1240 and its corresponding worm gear extension 1242 are rotatably mounted in the base plate 1234. A selector gear 1244 is mounted axially on each work gear extension 1242 so that each worm gear extension extends axially into an internal cavity within the selector gear 1244. A spring 1246 is mounted on each worm gear extension between the base plate 1234 and the selector gear 1244. Each spring 1246 biases its associated selector gear 1244 away from the base plate 1234 and toward base plate 1232, such that a gap exists between each selector gear 1244 and the base plate 1234. The spring loading of the selector gears 1244 by the springs 1246 may assist in returning the selector gears 1244 to their resting (disengaged) positions after the selector gears 1244 are moved into their engaged positions in the manner discussed below Each selector gear 1244 is mounted onto its respective worm gear extension 1242 so that the selector gear 1244 can move axially between the base plates 1232, 1234 relative to the worm gear extension 1242. The end of each worm gear extension 1242 may have a cross-section that corresponds to the cross-section of the internal cavity of its corresponding selector gear 1244 so that rotation of the selector gear 1244 causes corresponding rotation of the worm gear extension 1242 and the worm gear shaft 1240 that the worm gear extension 1242 extends from.

A piston 1250 is mounted on each worm gear shaft 1240 and is configured (e.g., via threads) to move axially relative to the worm gear shaft 1240 along its respective axis upon rotation of the worm gear shaft 1240. Each piston 1250 is connected to a mechanical linkage (not shown) that associates the piston 1250 with one or more phase shifters of an antenna, such that axial movement of the piston 1250 can cause at least one phase shift in the antenna. For example, axial movement of the piston 1250 can be used to move the wiper arm of the phase shifter 150 of FIG. 3.

Referring now to FIGS. 10B-10D, a ringed cam plate 1270 is mounted forwardly and spaced apart from base plate 1232. The cam plate 1270 has a nubbed cam 1272 that extends toward the base plate 1232. A ring gear 1274 with teeth on its inner diameter extends axially from the cam plate 1270 and is positioned for rotation about a central axis that extends generally in parallel and in the center of the axes defined by the worm gear shafts 1240. A cam plate drive motor 1276 is eccentrically mounted to rotate about an eccentric axis R; a gear (not shown) on a shaft (not shown) attached to the cam plate drive motor 1276 engages the teeth of the ring gear 1274.

Referring again to FIGS. 10B-10F, a stepper gear motor 1260 is mounted collinearly with the ring gear 1274 forward of the base plate 1232. A stepper gear 1264 is mounted to a drive shaft 1262 of the stepper gear motor 1260 and is positioned adjacent the base plate 1232 for rotation about the central axis. The stepper gear 1264 may be formed integrally with the drive shaft 1262. The stepper gear 1264 is positioned in the center of a circle defined by the worm gear shafts 1240, and is axially offset from the stepper gears 1244 that are mounted on the respective worm gear extensions 1242 when the stepper gears 1244 are in their resting (disengaged) positions. The stepper gear 1264 is sized so that its teeth can engage the teeth of a selector gear 1244 when the selector gear 1244 is in position adjacent the base plate 1234.

In operation, the cam plate 1270 is rotated about the central axis to an orientation in which the cam 1272 is positioned between the forward ends of two the selector gears 1244. When the cam 1272 is in this position, all of the selector gears 1244 are positioned to be spaced from the base plate 1234. Accordingly, all of the selector gears 1244 are disengaged from the stepper gear 1264, and therefore are not in position to drive any of the worm gear shafts 1240. As such, in this disengaged position, all of the pistons 1250 remain in place on their respective worm gear shafts 1240.

Upon a signal from a controller that a phase shift in the antenna is desired, the cam plate drive motor 1276 is activated and begins to rotate the cam plate 1270 about the central axis through interaction between the gear of the cam plate drive motor 1276 and the teeth of the ring gear 1274. As the cam plate 1270 rotates about the central axis, the cam 1272 serially engages each of the forward ends of the stepper gears 1244 and forces them toward the base plate 1234 and into position for engagement with the stepper gear 1264. Continued rotation of the cam plate 1270 about the central axis moves the cam 1272 past the forward end of a respective one of the selector gears 1244, allowing the spring loading of the selector gear 1244 to return the selector gear 1244 to its rest position.

When the cam 1272 reaches the forward end of the selector gear 1244 associated with the piston 1250 that is to be moved to induce the phase shift in the antenna, the cam plate drive motor 1276 ceases to move, thereby allowing cam 1272 to remain in engagement with the forward end of the selector gear 1244. Engagement of the forward end of the selector gear 1244 by the cam 1272 moves the selector gear 1244 rearwardly toward the base plate 1234 and into engagement with the stepper gear 1264 (this is shown in FIGS. 10D and 10F). The stepper gear motor 1260 then activates and rotates the stepper gear 1264 about the central axis. Rotation of the stepper gear 1264 rotates the engaged selector gear 1244 about its respective axis, which in turn rotates the worm gear shaft 1240 associated with the selector gear 1244 about the axis of the worm gear shaft 1240. Rotation of the worm gear shaft 1240 drives the piston 1250 axially along the worm gear shaft 1240 until the piston 1250 reaches a desired position, at which point the stepper gear motor 1260 deactivates. The cam plate 1270 can either remain in position or move to a rest position to await the next phase shift instruction. The stepper gear 1264 may be rotated in a first direction (e.g., clockwise) to move the pistons 1250 on any selected worm gear shaft 1240 away from the stepper motor 1260, and may be rotated in a second direction (e.g., counter-clockwise) to move the pistons 1250 on any selected worm gear shaft 1240 toward the stepper motor 1260.

The actuator 1230 is capable of adjusting up to six mechanical linkages via the six pistons 1250, each of which controls one or more phase shifters. In other embodiments, more or fewer linkages may be included.

Those of skill in this art will recognize that other variations of the actuator 1230 may be employed. For example, the pistons 1250 may be replaced by another axially-drivable member. The stepper gear 1264 may be any type of central drive gear, or even another variety of a central drive member, such as a wheel or disc that frictionally engages the selector gears 1244. The selector gears 1244 may be replaced with another rotary member, such as a wheel or disc that engages the central drive member. The cam plate 1270 and ring gear 1274 may be replaced with another engagement mechanism that selectively and exclusively engages one shaft at a time. The cam plate 1270 may have a recess rather than a cam 1272, such that a respective selector gear 1244 moves toward the base plate 1232 when the recess rotates in front of the selector gear, with engagement of the selector gear 1244 or other rotary member with the stepper gear 1264 occurring at a position spaced apart from, rather than adjacent to, the base plate 1234. Drive units other than the stepper gear motor 1260 and the cam plate drive motor 1276 may be employed. Other variations may also be apparent to those of skill in this art.

Figure 11A:
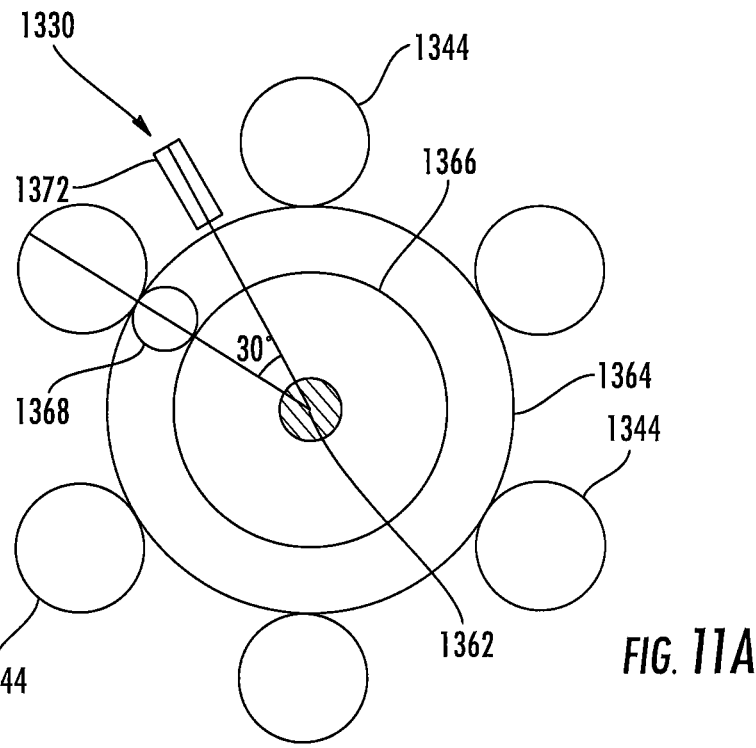
FIG. 11A is a schematic front view illustrating operation of a multi-RET actuator according to still further embodiments of the present invention.
Figure 11B:
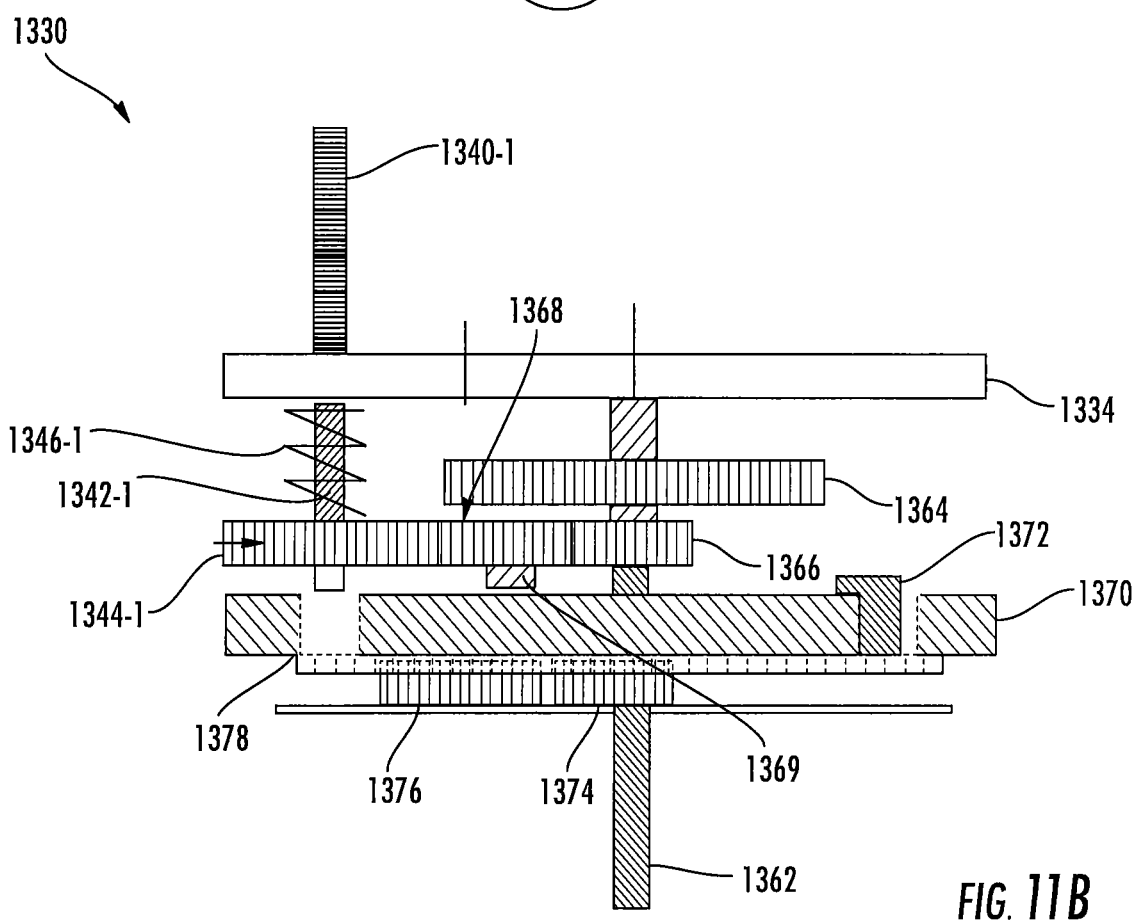
FIG. 11B is a schematic top view of a portion of the multi-RET actuator of FIG. 11A.
Figure 11C:
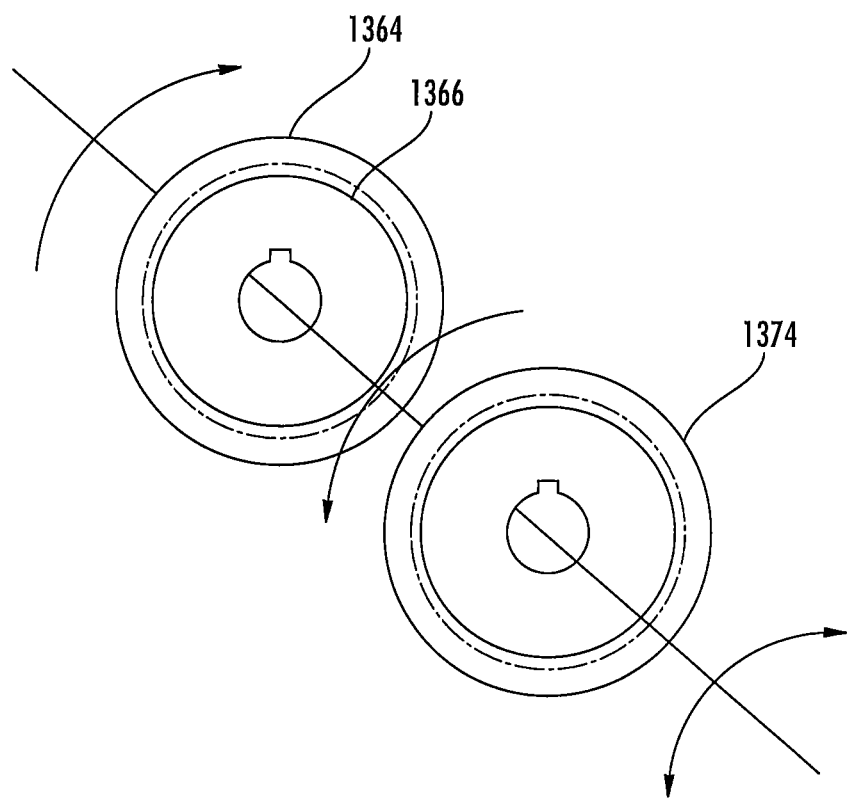
FIG. 11C is conceptual diagram illustrating operation of the gears attached to the drive shaft of the actuator of FIGS. 11A-11B.

Pursuant to still further embodiments of the present invention, multi-RET actuators are provided that use a single motor and a ratchet-based gear system to actuate multiple mechanical linkages. Examples of such embodiments are depicted in FIGS. 11A-11C. These multi-RET actuators may be similar to the single-motor multi-RET actuator 330 discussed above with reference to FIGS. 4A-4E, except the electromagnetic system for moving the secondary drive gears included in the multi-RET actuator 330 is replaced in multi-RET actuator 1330 with a ratchet based gear system. The ratchet based gear system is similar to the gear system included in the multi-RET actuator 1230 discussed above, but the use of ratcheted gears eliminates any need for a second motor.

Referring first to FIG. 11A, which is a schematic front view of the multi-RET actuator 1330 that illustrates various gears thereof, it can be seen that the multi-RET actuator 1330 includes a plurality of secondary drive gears 1344, a forward-direction primary drive gear 1364, a reverse direction primary drive gear 1366 and a reversing gear 1368. The multi-RET actuator 1330 may include circular base plates, worm gear shafts, worm gear extensions, springs and pistons that may be identical in both structure and arrangement to the base plates 1132, 1134, 1136, the worm gear shafts 1140, the worm gear extensions 1142, the springs 1146 and the pistons 1150 of multi-RET actuator 1130, and hence further description thereof will be omitted herein.

FIG. 11B is a schematic top view of the various gears included in multi-RET actuator 1330. A portion of one of the six worm gear shafts 1340-1 and its associated worm gear extension 1342-1 and spring 1346-1 are also illustrated in FIG. 11B, as is the circular base plate 1334 that abuts the forward ends of the worm gear shafts 1340.

As shown in FIG. 11B, a drive shaft 1362 of the single motor (not shown) of multi-RET actuator 1330 has three gears mounted thereon, namely the forward-direction primary drive gear 1364, the reverse direction primary drive gear 1366 and an indexing gear 1374. The forward-direction primary drive gear 1364 and the reverse direction primary drive gear 1366 are each ratcheted gears that only rotate in response to clockwise rotation of the drive shaft 1362 and which do not rotate in response to counter-clockwise rotation of the drive shaft 1362. A ringed cam plate 1370 is provided that may be located in the same position as the cam plate 1270 of multi-RET actuator 1230, and which is similar in design thereto. The ringed cam plate 1370 includes a circular channel 1378 on the rear surface thereof (shown in dotted lines in FIG. 11B which illustrates what a cross-section of the cam plate 1370 would look like), although it will be appreciated that the channel 1378 may be omitted in other embodiments. The ringed cam plate 1370 includes a fixed cam plate gear 1376 on a front surface thereof. The cam plate gear 1376 is positioned such that it is permanently engaged with the indexing gear 1374 that is mounted on drive shaft 1362. The cam plate 1370 further includes a nubbed cam 1372 on its rear surface that extends toward the base plate 1334. The cam 1372 is located in the channel 1378 so that the cam fills the channel 1378 and extends out of the channel 1378 as shown in FIG. 11B.

The cam plate 1370 is mounted for rotation about a central axis thereof (which may be the axis defined by the drive shaft 1362). The indexing gear 1374 is a ratchet gear that only rotates when the drive shaft rotates in a particular direction. For purposes of the discussion herein, it is assumed that the ratcheted indexing gear 1374 only rotates when the drive shaft rotates in the counter-clockwise direction, and that the forward-direction primary drive gear 1364 and the reverse-direction primary drive gear 1366 only rotate when the drive shaft rotates in the clockwise direction. It will be appreciated, however, that these directions may be reversed in other embodiments.

When the motor 1360 (not shown) rotates the drive shaft 1362 in the counter-clockwise direction, the indexing gear 1374 rotates in the clockwise direction. As noted above, a toothed cam plate gear 1376 is formed on the cam plate 1370. As the indexing gear 1374 is mounted so that the teeth thereof are in permanent engagement with the teeth of cam plate gear 1376, rotation of the indexing gear in the clockwise direction causes counter-clockwise rotation of the cam plate 1370 (since the cam plate 1370 is fixed to the cam plate gear 1376). Thus, by rotating the drive shaft 1362 in the counter-clockwise direction it is possible to rotate the cam plate 1370 in the counter-clockwise direction. The nubbed cam 1372 on cam plate 1370 may then be used to "select" one of the secondary drive gears 1344 in the same manner that the nubbed cam 1272 may be used to select one of the secondary drive gears 1244 of multi-RET actuator 1230. Accordingly, further description of the operation of cam plate 1370 and cam 1372 will be omitted.

As is also shown in FIG. 11B, the reversing gear 1368 is mounted for rotation on a shaft 1369 that extends rearwardly from the cam plate 1370. The reversing gear 1368 is axially aligned with each secondary drive gear 1344 and with the reverse-direction primary drive gear 1366 (i.e., they are each at the same distance from the circular base plate 1334). The reversing gear 1368 is positioned so that the teeth thereof permanently engage the teeth of the reverse-direction primary drive gear 1366, and so that the teeth of the reversing gear 1368 engage the teeth of each secondary drive gear 1344 when the reverse-direction primary drive gear 1366, the reversing gear 1368 and the secondary drive gear 1344 at issue are radially aligned.

The multi-RET actuator 1330 may operate as follows. In order to move a piston (not shown) that is mounted on a first of the worm gear shafts 1340-1 in a first direction (which we will assume here is the forward direction toward base plate 1334), the motor is activated to move the drive shaft 1362 in the counter-clockwise direction. As discussed above, this causes the indexing gear 1374 to rotate in the counter-clockwise direction which, via its interaction with the cam plate gear 1376, causes the cam plate 1370 to rotate in the counter-clockwise direction. The cam plate 1370 is rotated until the cam 1372 engages the forward end of secondary drive gear 1344-1 (i.e., the secondary drive gear that is associated with the piston that is to be moved). As cam 1372 engages secondary drive gear 1344-1, the secondary drive gear is pushed rearwardly so that the toothed section thereof engages for the forward-direction primary drive gear 1364. When this occurs, the motor is shut off. The cam plate 1370 may then be left in place or may be rotated further. When the cam plate 1370 is further rotated, the cam 1372 disengages from the selected secondary drive gear 1344, and the spring 1346 associated with the selected secondary drive gear 1344 pushes the selected secondary drive gear 1344 back into its resting position.

In order to move the piston in the forward direction, the motor is turned back on in the opposite direction so that the drive shaft 1362 rotates in the clockwise direction. As discussed above, the indexing gear 1374 is ratcheted and hence does not rotate in response to the clockwise rotation of the drive shaft 1362. However, the forward-direction and reverse-direction primary drive gears 1364, 1366 are oppositely ratcheted, and hence both of these gears 1364, 1366 rotate in the clockwise direction in response to the clockwise rotation of the drive shaft 1362.

As the secondary drive gears 1344 are circumferentially spaced at equal distances, the secondary drive gears 1344 may be radially spaced apart from each other at 60° intervals. As shown schematically in FIG. 11A, the reversing gear 1368 and the cam 1372 may be spaced apart from each other by about 30°. As a result, when the cam 1372 is used to select one of the secondary drive gears 1344 in the manner described above, the reversing gear 1368 may be radially positioned about midway between two of the secondary drive gears 1344, and hence is not in contact with any of the secondary drive gears 1344.

As the drive shaft 1362 rotates in the clockwise direction, both the forward-direction primary drive gear 1364 and the reverse-direction primary drive gear 1366 rotate in the clockwise direction. The reverse-direction primary drive gear 1366 rotates the reversing gear 1368, but as the reversing gear 1368 does not engage any of the secondary drive gears 1344, this rotation has no effect. The clockwise rotation of the forward-direction primary drive gear 1364 results in counter-clockwise rotation of the selected secondary drive gear 1344-1. The counter-clockwise rotation of the selected secondary drive gear 1344-1 results in counter-clockwise rotation of the worm gear shaft 1340-1, which causes the piston mounted thereon to move in the forward direction toward base plate 1334.

In order to move the piston associated with secondary drive gear 1344-1 in the rearward direction (i.e., away from base plate 1334), the motor is activated to move the drive shaft 1362 in the counter-clockwise direction. As discussed above, this causes the cam plate 1370 to rotate in the counter-clockwise direction. The cam plate 1370 is rotated until the reversing gear 1368 is radially aligned with the selected secondary drive gear 1344-1 so that the teeth on the reversing gear 1368 engage the teeth on the reverse-direction drive gear 1366 and the teeth of the selected secondary drive gear 1344-1. Note that when the cam plate 1370 is rotated to this position, the cam 1372 is radially positioned between two of the secondary drive gears 1344, and hence all six of the secondary drive gears 1344 remain in their resting positions (i.e., the position shown in FIG. 11B).

Once the reversing gear 1368 has been rotated to engage the selected secondary drive gear 1344-1, the motor reverses direction to rotate the drive shaft 1362 in the clockwise direction. As the indexing gear 1374 is ratcheted, it does not rotate in response to the clockwise rotation of the drive shaft 1362 and hence the cam plate 1370 remains stationary. The forward-direction and reverse-direction primary drive gears 1364, 1366 rotate in the clockwise direction in response to the clockwise rotation of the drive shaft 1362.

As all of the secondary drive gears 1344 are in their respective resting positions, the rotation of the forward-direction primary drive gear 1364 does not have any effect. However, the clockwise rotation of the reverse-direction primary drive gear 1366 results in counter-clockwise rotation of the reversing gear 1368, which in turn results in clockwise rotation of the selected secondary drive gear 1344-1. The clockwise rotation of the selected secondary drive gear 1344-1 results in clockwise rotation of the worm gear shaft 1340-1, which causes the piston mounted thereon to move in the rearward direction, away from base plate 1334. Thus, as described above, the motor in conjunction with the ratcheted gear system described above may be used to select any of the worm gear shafts 1340 and move a piston mounted thereon in either direction.

FIG. 11C conceptually illustrates the operation of the drive shaft 1362 and the ratcheted gears 1364, 1366, 1374 attached thereto. Note that to avoid undesired movements of non-selected ones of the secondary drive gears 1344 when the index gear 1374 is being moved, the torque of each secondary drive gear 1344 should be greater than the torque of the reversing gear 1368 plus the torque of the drive reverse-direction primary drive gear 1366.

It should be noted that the forward-direction primary drive gear 1364 and the reverse-direction primary drive gear 1366 need only move the pistons 1150 in opposite directions. The actual direction (i.e., forward or reverse along the worm gear shafts 1140) of movement of the pistons is arbitrary.

The multi-RET actuator 1330 of FIGS. 11A-11C may be viewed as comprising a plurality of shafts (e.g., the worm gear shafts 1340 and their associated worm gear extensions 1342) that have respective axially-drivable members (e.g., the pistons 1350) mounted thereon. Each of axially-drivable member may be configured to be connected to a respective one of a plurality of phase shifters. The multi-RET actuator 1330 further includes a motor 1360 having a drive shaft 1362 and a gear system that is configured to selectively couple the motor 1360 to the respective shafts 1340/1342. The gear system is configured so that rotation of the drive shaft 1362 in a first direction creates a mechanical linkage between the motor 1360 and a first of the shafts 1340/1342, and rotation of the drive shaft 1362 in a second direction that is opposite the first direction rotates the first of the shafts 1340/1342.

The gear system may include a forward-direction primary drive gear 1364 that is connected to the drive shaft 1362 and a reverse-direction primary drive gear 1366 that is connected to the drive shaft 1362. The forward-direction primary drive gear 1364 and the reverse-direction primary drive gear 1366 are each ratcheted gears that rotate in response to rotation of the drive shaft 1362 in the second direction and which do not rotate in response to rotation of the drive shaft 1362 in the first direction. The gear system may further include a reversing gear 1368 that is configured to engage the reverse-direction primary drive gear 1366 and rotate in a direction opposite a direction of rotation of the reverse-direction primary drive gear 1366. The gear system may also include a plurality of secondary drive members (e.g., the secondary drive gears 1344) that are mounted on respective ones of the shafts 1340/1342, each secondary drive member 1344 mounted so that rotation thereof will result in rotation of a respective one of the shafts 1340/1342. The gear system may also include an engagement mechanism (e.g., the cam plate 1370) that is configured to rotate to selectively and exclusively engage one or more of the shafts 1340/1342 to move a selected one of the secondary drive members 1344 into engagement with one of the forward-direction primary drive gear 1364 or the reversing gear 1368.

Pursuant to further embodiments of the present invention, methods of adjusting a phase shifter are provided. These methods may be implemented using, for example, the multi-RET actuator 1330 of FIGS. 11A-11C. Pursuant to these methods, a drive shaft (e.g., drive shaft 1362) is rotated in a first direction to connect a first of a plurality of gears (e.g., secondary drive gear 1344-1) to a drive mechanism. The drive shaft 1362 is then rotated in a second direction to rotate a gear of the drive mechanism, wherein rotation of the gear of the drive mechanism causes rotation of the first of the plurality of gears 1344, and rotation of the first of the plurality of gears 1344 mechanically adjusts a physical position of a component of the phase shifter.

The plurality of gears may be secondary drive gears 1344 that are configured to rotate respective shafts such as worm gear shafts 1340. The drive mechanism may include a forward-direction primary drive gear 1364 that is connected to the drive shaft 1362 and a reverse-direction primary drive gear 1366 that is connected to the drive shaft 1362. The forward-direction primary drive gear 1364 may be a ratcheted gear that only rotates in response to rotation of the drive shaft in a first direction, and the reverse-direction primary drive gear 1366 may be a ratcheted gear that only rotates in response to rotation of the drive shaft 1362 in the first direction. The plurality of gears may further include a reversing gear 1368. At least one of the forward-direction primary drive gear 1364 or the reverse-direction primary drive gear 1366 may be configured to engage the first of the plurality of gears 1344-1 through the reversing gear 1368.

While FIG. 3 above depicts a conventional wiper-arc type phase shifter, numerous other types of electromechanical phase shifters are known in the art. It will be appreciated that the actuators disclosed herein are suitable for use with a wide variety of different phase shifters.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Herein, the terms "attached", "connected", "interconnected", "contacting", "mounted" and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

That which is claimed is:

1. An actuator for a plurality of phase shifters, comprising:
    a plurality of axially-drivable members, each axially-drivable member mounted on a respective parallel shaft, the axially-drivable members configured to be connected with a respective one of the phase shifters;
    a drive member having a primary rotary member;
    a plurality of secondary rotary members, each mounted on a respective one of the parallel shafts;
    wherein at least one of the primary rotary member and the secondary rotary members are axially movable so that each secondary rotary member may be in either an engaged position, in which the secondary rotary member engages the drive member, and a disengaged position, in which the secondary rotary member is disengaged from the drive member;
    a first engagement mechanism that is configured to axially move the primary rotary member or one of the secondary rotary members so that at least one of the secondary rotary members is in the engaged position; and
    an electric motor that is configured to drive the drive member,
    wherein the first engagement mechanism comprises an electromagnet.

2. The actuator of claim 1, wherein the first engagement mechanism further comprises a permanent magnet or a ferromagnetic structure that is axially aligned with the electromagnet.

3. The actuator of claim 2, wherein the first engagement mechanism further comprises a spring that is between the permanent magnet or ferromagnetic structure and the electromagnet.

4. The actuator of claim 1, wherein the first engagement mechanism is one of a plurality of engagement mechanisms, and wherein each of the engagement mechanisms is configured to selectively move a respective one of the secondary rotary members.

5. The actuator of claim 1, wherein the first engagement mechanism is configured to move the primary rotary member to selectively engage the primary rotary member with one of the secondary rotary members.

6. The actuator of claim 1, wherein the parallel shafts comprise worm gear shafts.

7. The actuator of claim 1, wherein the primary rotary member is a central gear and each of the secondary rotary members are gears.

8. The actuator of claim 1, wherein the axially-drivable members comprise pistons.

9. The actuator of claim 1, wherein the spring biases one of the secondary rotary members toward the disengaged position.

10. The actuator of claim 1, in combination with a base station antenna that includes a plurality of linear arrays of radiating elements, wherein each of the phase shifters is coupled between the radiating elements of a respective one of the linear arrays and a port of a radio.

11. An actuator for a plurality of phase shifters, comprising:
    a motor that is configured to rotate a primary rotary member;
    a plurality of axially-drivable members, each axially-drivable member mounted on a respective shaft, each axially-drivable member configured to be connected with a respective one of the phase shifters;
    a plurality of secondary rotary members, each secondary rotary member mounted so that rotation thereof will result in rotation of a respective one of the shafts; and
    an electromagnet that is configured to move either the primary rotary member or a selected one of the secondary rotary members in response to a control signal so that the primary rotary member engages the selected one of the secondary rotary members.

12. The actuator of claim 11, wherein the electromagnet is configured to move the primary rotary member into engagement with the selected one of the secondary rotary members.

13. The actuator of claim 12, further comprising a permanent magnet or a ferromagnetic structure that is axially aligned with the electromagnet, wherein the electromagnet is attracted to the permanent magnet or ferromagnetic structure in response to the control signal.

14. The actuator of claim 13, further comprising a spring that is between the permanent magnet or ferromagnetic structure and the electromagnet, the spring biasing the primary rotary member into a disengaged position in which the primary rotary member is not engaged with any of the secondary rotary members.

15. The actuator of claim 12, further comprising a permanent magnet that is axially aligned with the electromagnet, wherein the electromagnet is repelled from the permanent magnet in response to the control signal.

16. The actuator of claim 12, wherein the electromagnet is configured to move the selected one of the secondary rotary members into engagement with the primary rotary member.

17. The actuator of claim 16, further comprising a permanent magnet or a ferromagnetic structure that is axially aligned with the electromagnet, wherein the electromagnet is attracted to the permanent magnet or ferromagnetic structure in response to the control signal.

18. The actuator of claim 16, further comprising a permanent magnet that is axially aligned with the electromagnet, wherein the electromagnet is repelled from the permanent magnet in response to the control signal.

19. An actuator for a plurality of phase shifters, comprising:
an electric motor that is configured to rotate a primary rotary member;
a plurality of axially-drivable members, each axially-drivable member mounted on a respective parallel shaft, the axially-drivable members configured to be connected with a respective one of the phase shifters;
a plurality of secondary rotary members, each mounted on a respective one of the parallel shafts;
wherein at least one of the primary rotary member and the secondary rotary members are axially movable so that each secondary rotary member may be in either an engaged position, in which the secondary rotary member engages the drive member, and a disengaged position, in which the secondary rotary member is disengaged from the drive member; and
an electromagnetic engagement mechanism that includes an electromagnet, the electromagnetic engagement mechanism is configured to axially move the primary rotary member or one of the secondary rotary members so that at least one of the secondary rotary members is in the engaged position.

20. The actuator of claim 19, wherein the electromagnetic engagement mechanism further comprises a permanent magnet or a ferromagnetic structure that is axially aligned with the electromagnet.

21. The actuator of claim 20, wherein the electromagnetic engagement mechanism further comprises a spring that is between the permanent magnet or ferromagnetic structure and the electromagnet.

22. The actuator of claim 19, wherein the electromagnetic engagement mechanism is one of a plurality of engagement mechanisms, and wherein each of the engagement mechanisms is configured to selectively move a respective one of the secondary rotary members.

23. The actuator of claim 19, wherein the electromagnetic engagement mechanism is configured to move the primary rotary member to selectively engage the primary rotary member with one of the secondary rotary members.

24. The actuator of claim 19, wherein the parallel shafts comprise worm gear shafts.

25. The actuator of claim 19, wherein the primary rotary member is a central gear and each of the secondary rotary members are gears.

26. The actuator of claim 19, wherein the axially-drivable members comprise pistons.

27. The actuator of claim 19, wherein the spring biases one of the secondary rotary members toward the disengaged position.

28. The actuator of claim 19, in combination with a base station antenna that includes a plurality of linear arrays of radiating elements, wherein each of the phase shifters is coupled between the radiating elements of a respective one of the linear arrays and a port of a radio.

* * * * *